(12) United States Patent  (10) Patent No.: US 7,920,201 B2
Wakikawa et al.  (45) Date of Patent: Apr. 5, 2011

(54) SHUTTER AND MIRROR DRIVING MECHANISM FOR AN IMAGE PICKUP APPARATUS

(75) Inventors: Masanao Wakikawa, Osaka (JP); Yoshiyuki Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 495 days.

(21) Appl. No.: 11/961,438

(22) Filed: Dec. 20, 2007

(65) Prior Publication Data
US 2008/0151093 A1 Jun. 26, 2008

(30) Foreign Application Priority Data

Dec. 21, 2006 (JP) ................................ 2006-344680

(51) Int. Cl.
*H04N 5/225* (2006.01)
*G02B 13/16* (2006.01)

(52) U.S. Cl. ....................................... 348/335; 396/354

(58) Field of Classification Search .................. 348/335, 348/337, 341, 374, 362, 363, 373; 396/220, 396/248, 354, 355, 358, 357, 373, 374, 447, 396/452, 456, 467, 468, 478, 479, 480
See application file for complete search history.

(56) References Cited

U.S. PATENT DOCUMENTS

| 5,773,940 A * | 6/1998 | Matsukawa | 318/59 |
| 2004/0090672 A1* | 5/2004 | Goto et al. | 359/399 |
| 2006/0067676 A1* | 3/2006 | Toyoda | 396/466 |

FOREIGN PATENT DOCUMENTS

| JP | 4-53408 | 2/1992 |
| JP | 2006-184717 | 7/2006 |

* cited by examiner

*Primary Examiner* — Nelson D. Hernández Hernández
(74) *Attorney, Agent, or Firm* — Hamre, Schumann, Mueller & Larson, P.C.

(57) ABSTRACT

An image pickup apparatus of the present invention includes a mechanical lock mechanism capable of holding a first curtain and a second curtain in an open state mechanically and a controller that controls the mechanical lock mechanism so as to hold the second curtain in the open state and controls a display so as to display image data generated based on a subject image incident upon an image pickup element as a moving image while the first curtain is in the open state.

12 Claims, 32 Drawing Sheets

SHUTTER AND MIRROR DRIVING MECHANISM FOR AN IMAGE PICKUP APPARATUS

BACKGROUND OF THE INVENTION

1. Field of the Invention

The present invention relates to an image pickup apparatus including an image pickup element that captures a subject by controlling exposure to light incident through a lens by the use of a shutter.

2. Description of Related Art

In a single-lens reflex camera whose lens is exchangeable, when a subject, which is taken by reflecting light incident through a lens by a mirror, is observed directly (hereinafter, referred to as "finder photographing") through a finder, a shutter unit placed in the vicinity of an image pickup element is moved by a shutter driving mechanism driven with a cam that functions in synchronization with a motor from a first stop position, at which the mirror is lowered from a shutter charge completion state so as to make it possible to observe the subject through the finder, to a third stop position, at which the shutter charge is released so as to lift the mirror further to a retracting position. At the third stop position, before the shutter charge is released, a first electromagnetic holding portion (solenoid) holding a first light shielding body (first shutter curtain) on an upper side and a second electromagnetic holding portion (solenoid) holding a second light shielding body (second shutter curtain) on an upper side are both energized, and the first light shielding body and the second light shielding body are both held on the upper side.

During exposure, the first light shielding body that opens an opening as a result of the cancel of the energization of the first electromagnetic holding portion runs downward, and the second light shielding body that closes the opening as a result of the cancel of the energization of the second electromagnetic holding portion after the elapse of a predetermined exposure time runs downward. The first light shielding body or the second light shielding body covers the opening at all times except for the exposure time, thereby blocking light incident upon the image pickup element.

Furthermore, recently, a camera (digital still camera) using an image pickup element is equipped with a high-definition liquid crystal monitor, thereby being able to display an image captured with the image pickup element. This enables not only the above finder photographing, but also "live view photographing" in which a subject can be photographed while being observed on a monitor.

During the live view photographing, the energization of only the first electromagnetic holding portion that holds the first light shielding body on the upper side is cancelled at the second stop position, whereby only the first light shielding body retracts downward. The second electromagnetic holding portion remains energized to keep the second light shielding body retracting on the upper side and maintains an opening state, whereby the shutter stops while light through the lens reaches the image pickup element at all times. Consequently, a video (through image) of a subject obtained from the image pickup element can be displayed on a monitor mounted on a camera body. The above configuration is disclosed by Patent Document 1 (JP 4-53408 A) and Patent Document 2 (JP 2006-184717 A).

However, according to the configuration disclosed by Patent Documents 1 and 2, the second light shielding body is kept retracted on the upper side after the first light shielding body retracts downward at the second stop position, so that the second electromagnetic holding portion needs to be energized continuously. Thus, there is a problem that the second electromagnetic holding portion is energized continuously during a live view mode, which increases the power consumption.

Furthermore, during the live view photographing state, the shutter is moved from the second stop position that is in the live view photographing state to the third stop position again through the first stop position during the period from a time when a release button is operated by a photographer to a time when exposure is performed, whereby a series of exposure operations are performed. After that, the shutter is moved to the second stop position through the first stop position, and stopped in the live view photographing state. Thus, there is a problem that it takes a very long period from a time when the release button is operated to a time when exposure is performed actually in the live view photographing state.

SUMMARY OF THE INVENTION

Therefore, with the foregoing in mind, it is an object of the present invention to provide an image pickup apparatus capable of reducing power consumption, and shortening the period from a time when a release button is operated to a time when exposure is performed actually, thereby enhancing a photographing response.

An image pickup apparatus of the present invention includes: a shutter having a first curtain and a second curtain; a shutter driver that drives the shutter so as to shift the first curtain from an open state to a closed state and to shift the second curtain from a closed state to an open state; a solenoid for a first curtain that holds the first curtain in the closed state with an electromagnetic force; a solenoid for a second curtain that holds the second curtain in the open state with an electromagnetic force; a holder capable of holding the first curtain and/or the second curtain in the open state mechanically; an image pickup that captures a subject image passing through the shutter to generate image data while the shutter is in the open state; a display that displays an image based on image data obtained by subjecting the image data generated by the image pickup to predetermined processing; and a controller that controls the holder so as to hold the second curtain in the open state and controls the display so as to display the image data generated based on the subject image incident upon the image pickup as a moving image while the first curtain is in the open state.

DETAILED DESCRIPTION OF THE INVENTION

Embodiment 1

1. Basic Configuration and Operation of an Image Pickup Apparatus

Figure 1:
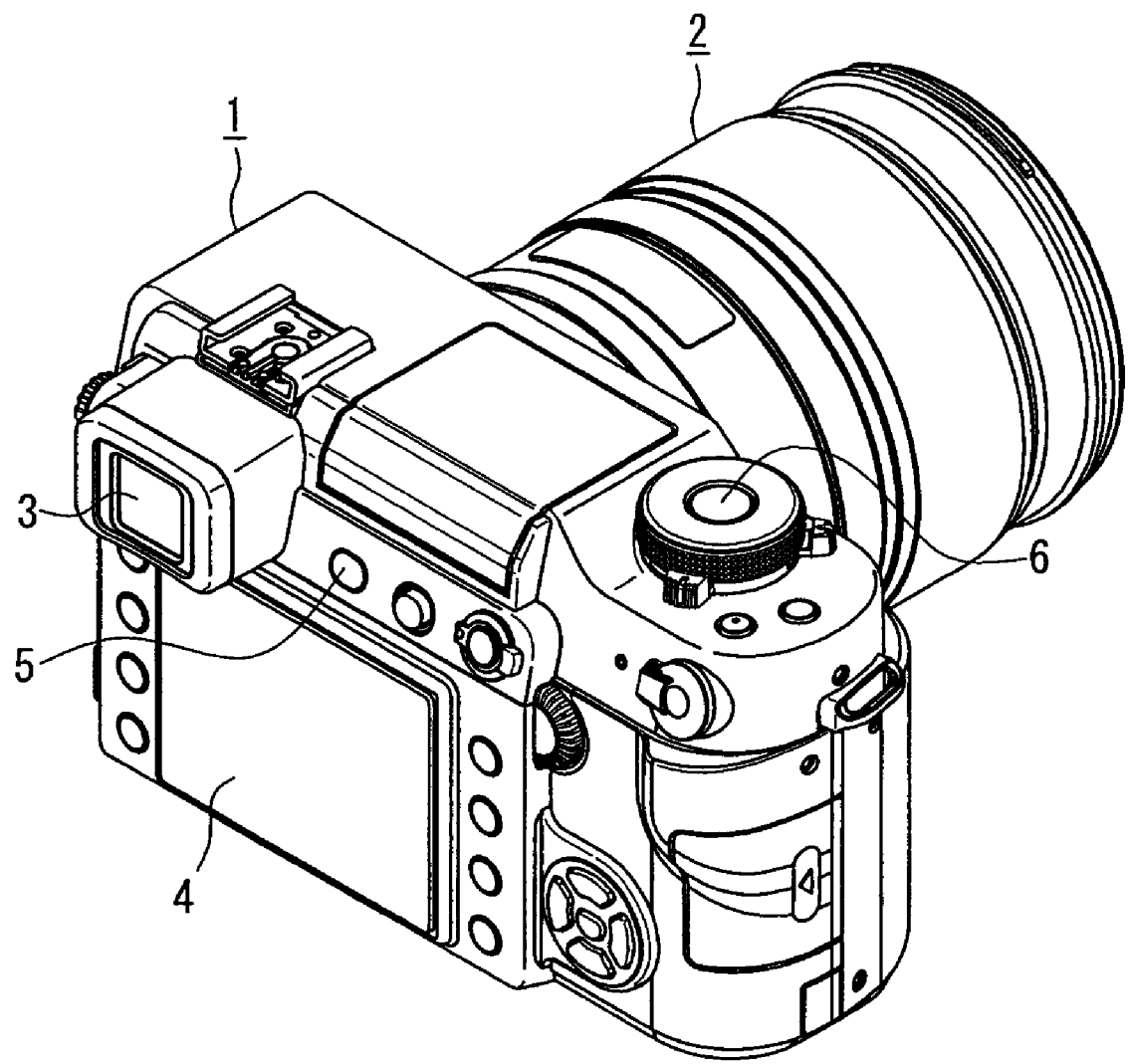
FIG. 1 is a perspective view showing an outer appearance of an image pickup apparatus in Embodiment 1.
Figure 2:
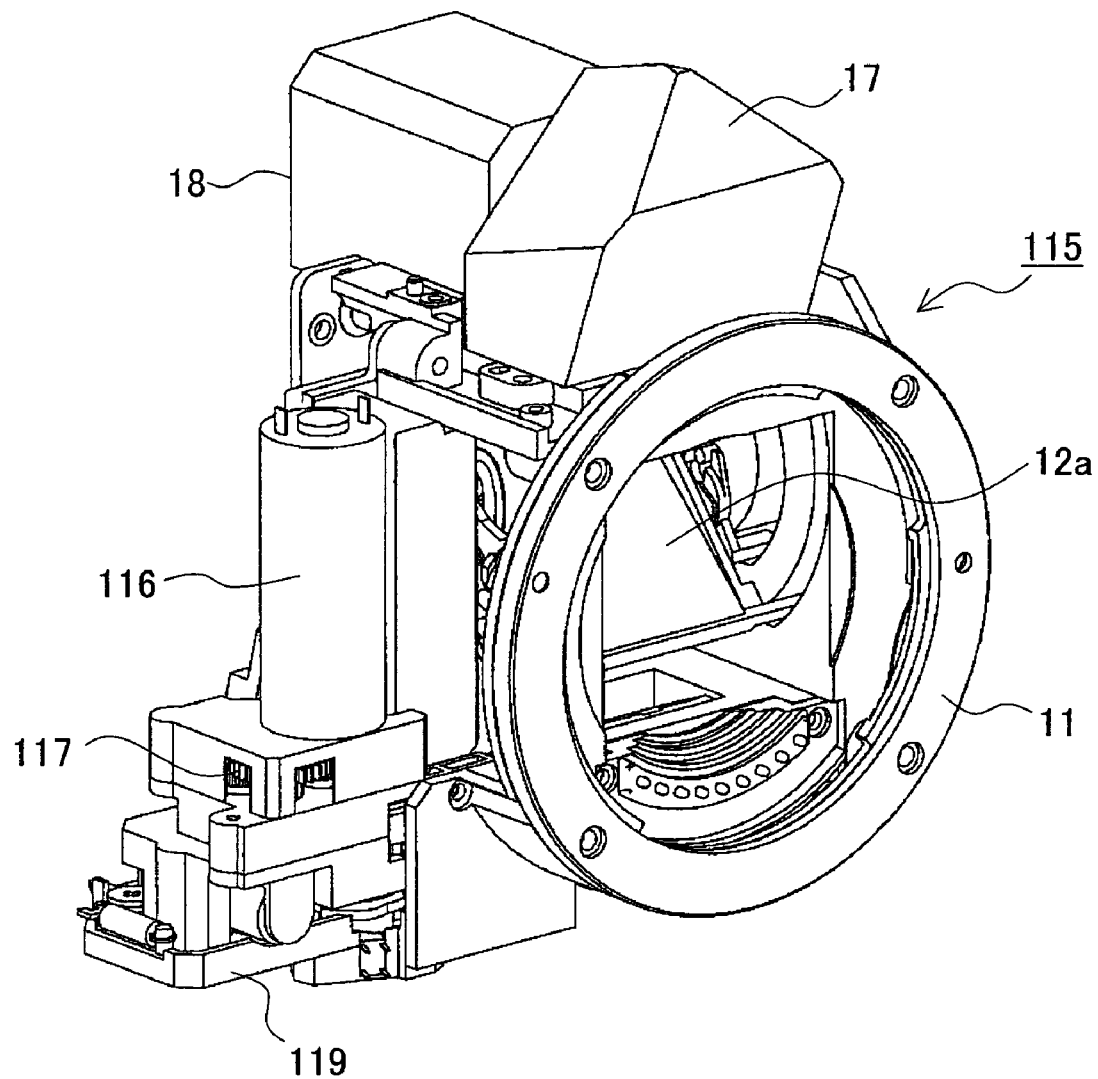
FIG. 2 is a perspective view showing configurations of a shutter unit and a driving unit in Embodiment 1.
Figure 3A:
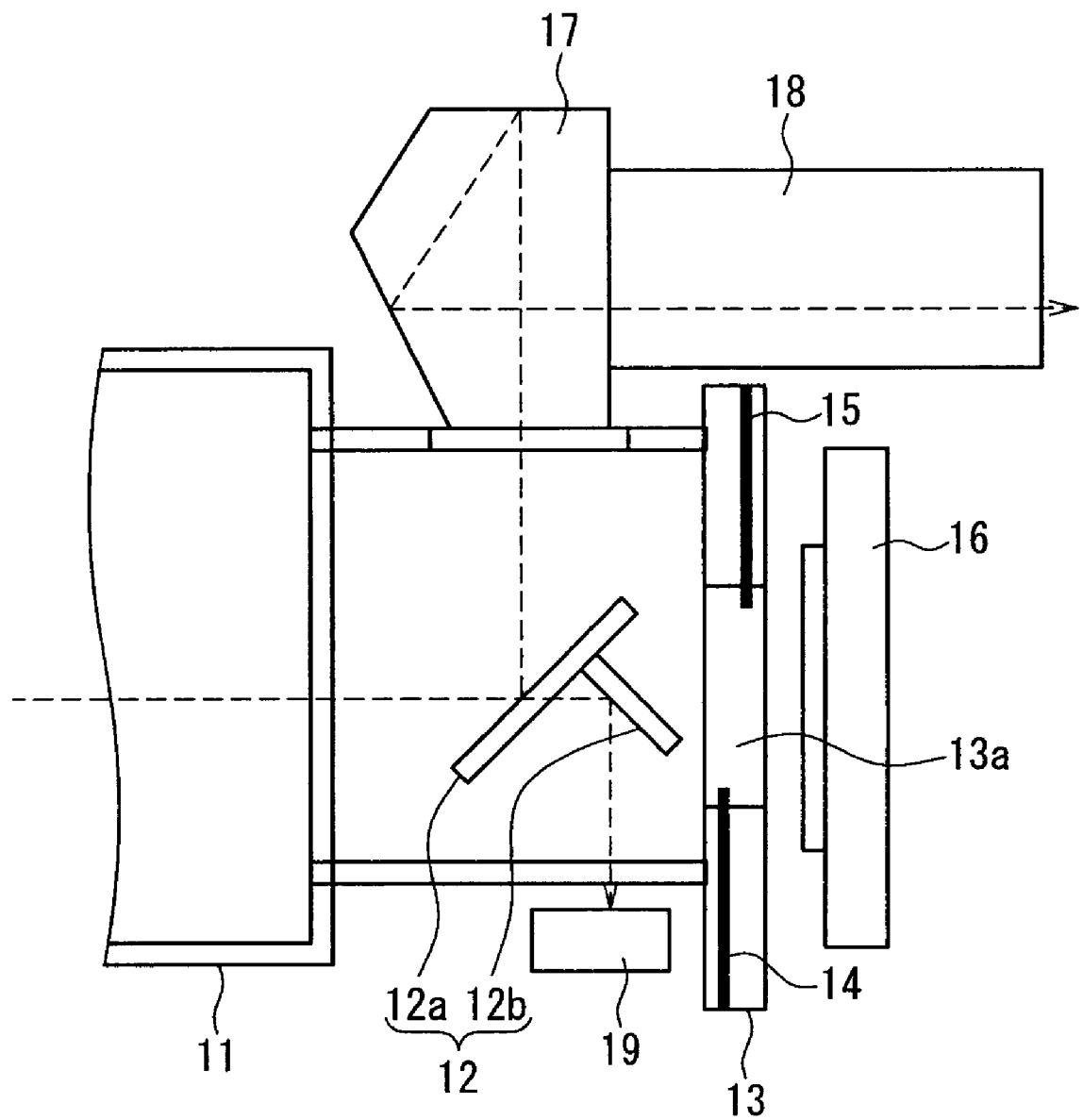
FIG. 3A is a schematic view showing an internal configuration of the image pickup apparatus in Embodiment 1.
Figure 3B:
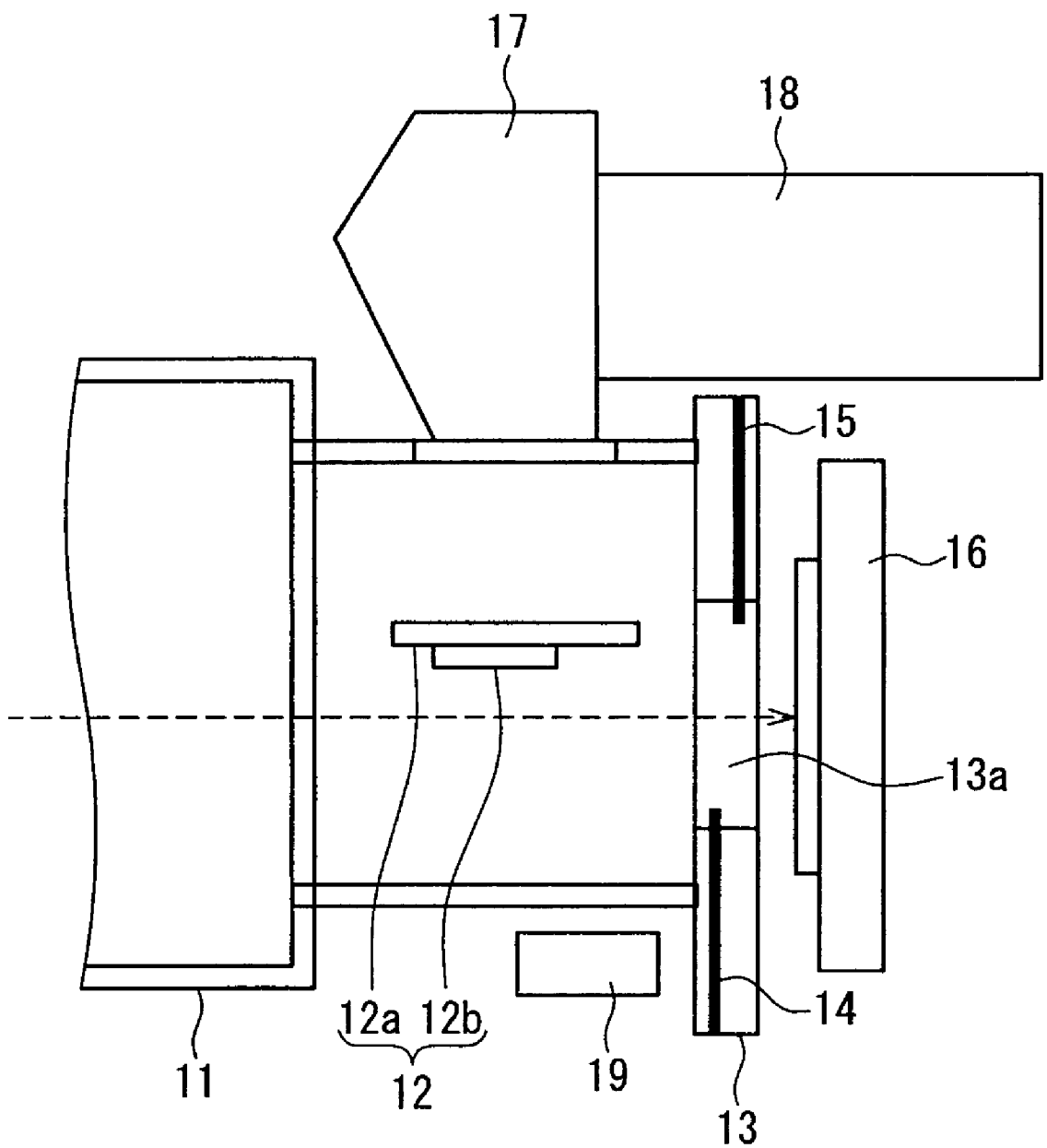
FIG. 3B is a schematic view showing an internal configuration of the image pickup apparatus in Embodiment 1.

FIG. 1 is a perspective view showing an outer appearance of an image pickup apparatus in Embodiment 1. FIG. 2 is a perspective view of an image pickup unit placed in the image pickup apparatus. FIGS. 3A and 3B are schematic views each showing an internal configuration of the image pickup apparatus in Embodiment 1.

As shown in FIG. 1, the image pickup apparatus mainly is composed of a body unit 1 and a lens unit 2. The body unit 1 itself is a kind of an image pickup apparatus.

The body unit 1 includes a viewfinder 3, a monitor 4, a display switch button 5, and a release button 6 on an outer surface. The body unit 1 includes an image pickup unit.

The lens unit 2 includes an objective lens, a zoom lens, a focus lens, and the like, and can be attached/detached with respect to a predetermined portion of the camera body 1. In the present embodiment, although the lens unit 2 is attachable/detachable with respect to the body unit 1, it may be integrated with the body unit 1 so as not to be attachable/detachable with respect thereto.

The viewfinder 3 enables a user to recognize visually an optical image incident upon the body unit 1 through the lens unit 2 when the user peers through the viewfinder 3. The state in which an optical image can be recognized visually through the viewfinder 3 can be obtained selectively by operating the display switch button 5 (described later). The state in which an optical image can be recognized visually through the viewfinder 3 will be referred to as a "finder view state". Furthermore, the mode in which an optical image can be recognized visually through the viewfinder 3 in the image pickup apparatus will be referred to as a "finder view mode".

The monitor 4 (display means) can display an image based on an electrical image signal obtained as a result of the photoelectrical conversion in an image pickup element (described later). The monitor 4 also can display an image based on image data recorded on an information medium (not shown) such as a memory card placed in the body unit 1. The monitor 4 can display not only an image but also the number of photographable images, the current date, information accompanying an image (photographing date), and the like. Although the monitor 4 is composed of a liquid crystal display of about 1 to 3 inches in the present embodiment, the size and kind of the monitor 4 are not limited thereto, and the monitor 4 may be composed of an EL display, a plasma display, or the like. The state in which the monitor 4 displays an image can be obtained selectively by operating the display switch button 5 (described later). Furthermore, the state in which an electrical image can be recognized visually on the monitor 4 will be referred to as a "live view state". Furthermore, the mode in which an electrical image can be recognized visually on the monitor 4 will be referred to as a "live view mode".

The finder view state and the live view state can be switched therebetween by operating the display switch button 5. When the display switch button 5 is operated, a control microcomputer (not shown) in the image pickup apparatus controls each portion such as a shutter and a movable mirror in the apparatus to shift the state so as to be suitable for the finder view mode or the live view mode.

The release button 6 (operation means) receives a depression operation by the user, and can perform a focus control and a photographing control (recording control) by being pressed. The release button 6 includes a two-stage switch, and can perform "halfway depression" in which the release button 6 is pressed substantially halfway through a stroke range and "full depression" in which the release button 6 is pressed substantially fully through the stroke range. When the release button 6 is pressed halfway, the microcomputer in the body unit 1 drives a focus lens in the lens unit 2 to perform a focus control of a captured image. When the release button 6 is pressed fully, the microcomputer in the body unit 1 controls the image pickup element so that it converts an optical image into an electrical image and outputs the resultant image, thereby recording the electrical image on an information medium such as a memory card.

Next, the configuration of the image pickup unit will be described.

As shown in FIGS. 2 and 3, the image pickup unit includes a case 11, a movable mirror 12, a shutter portion 13, a first curtain 14, a second curtain 15, an image pickup element 16, a prism 17, a finder portion 18, and an autofocus (AF) sensor 19. Although the image pickup unit has various other configurations, only the configuration required for describing the present embodiment is shown for convenience of description.

The case 11 covers the outer area of the image pickup unit, and a substantially cylindrical space is formed therein. Furthermore, light (represented by a broken arrow in FIGS. 3A and 3B) is incident upon the inner space of the case 11 through an objective lens (not shown) and the like, and the incident light reaches the shutter portion 13 and the prism 17 through the inner space of the case 11.

The movable mirror 12 is composed of a main mirror 12a and a sub-mirror 12b. Furthermore, the movable mirror 12 is placed so as to enter or retract with respect to an incident optical path. The movable mirror 12 can be displaced between a first position (for example, see FIG. 3A) at which the movable mirror 12 enters the optical path so as to be able to reflect the incident light to the prism 17 side and the AF sensor 19 side, and a second position (for example, see FIG. 3B) at which the movable mirror 12 retracts from the optical path so as to guide the incident light to the shutter portion 13 side. The main mirror 12a reflects the incident light to the prism 17 aide at the first position. The main mirror 12a is composed of a half mirror so that it transmits a part of the incident light to the sub-mirror 12b side. The sub-mirror 12b reflects a part of the incident light to the AF sensor 19 side at the first position. The movable mirror 12 can be controlled so as to enter or retract with respect to the incident optical path by a driving mechanism provided separately when the display switch button 5 is operated, the release button 6 is operated, or the like. A detailed operation will be described later.

The shutter portion 13 is placed so that a part thereof is positioned in the incident optical path, and hence, can block or transmit light incident upon the image pickup element 16. Specifically, the shutter portion 13 can be displaced between an open state (or example, see FIG. 3A) in which the shutter portion 13 allows light to be incident upon at least the image pickup element 16, and a closed state in which the shutter portion 13 blocks the incident light with respect to the image pickup element 16. Furthermore, the shutter portion 13 is operated so as to allow the incident light to be incident upon the image pickup element 16 for a predetermined period of time. Furthermore, the shutter portion 13 includes the first curtain 14 and the second curtain 15 for blocking or guiding the incident light. The shutter portion 13 is driven by a driving mechanism provided separately when the display switch button 5 or the release button 6 is operated. A detailed operation will be described later.

The first curtain 14 can move between a position (for example, see FIG. 3A) at which an opening 13a of the shutter portion 13 is opened and a position at which the opening 13a is closed. Furthermore, the movement range of the first curtain 14 is placed on the lens unit 2 side, compared with that of the second curtain 15. The movement direction of the first curtain 14 is substantially perpendicular to an optical axis.

The second curtain 15 can move between a position (for example, see FIG. 3A) at which the opening 13a of the shutter portion 13 is opened and a position at which the opening 13a is dosed. Furthermore, the movement range of the second curtain 15 is placed on the image pickup element 16 side, compared with that of the first curtain 14. Furthermore, the movement direction of the second curtain 15 is substantially perpendicular to the optical axis.

The image pickup element 16 (image pickup means) receives light incident through the shutter portion 13 on an image pickup plane and converts an optical image signal into an electrical image signal to output the resultant signal. The image pickup element 16 performs a photographing operation at all times when the image pickup apparatus is in a photographing mode and a live view state, and a captured image (through image) is displayed on the monitor 4. The image pickup element 16 is composed of, for example, a CCD image sensor, a CMOS image sensor, and the like. Furthermore, although a detailed configuration is omitted, the electrical image signal output from the image pickup element 16 is subjected to various kinds of signal processings such as noise removal and digital conversion. Furthermore, an image signal after being subjected to signal processing can be converted into image data and recorded on an information medium such as a memory card.

The prism 17 is placed in an upper portion of the case 11, and can reflect light which is reflected from the main mirror 12a and guide it to the finder portion 18.

The finder portion 18 can guide the light reflected in the prism 17 to an outside. Furthermore, the finder portion 18 is contained in the viewfinder 3 in FIG. 1 and is provided with an eyepiece at an end thereof. The user can recognize an optical image visually through the eyepiece by peering through the finder portion 18.

The AF sensor 19 is composed of a photoelectric converter that receives light reflected from the sub-mirror 12b and converts the light photoelectrically. The AF sensor 19 is composed of, for example, a line sensor, a CMOS sensor, and the like. The AF sensor 19 detects a focal position or a focal length of a formed optical image.

A motor 116 is a driving source that drives the movable mirror 2 and the shutter portion 3.

A gear train 117 transmits the driving force output from the motor 116 to a mirror driving portion 115 and a shutter driving portion 118 (both will be described later).

Referring to FIGS. 3A and 3B, the basic operation of the image pickup apparatus in Embodiment 1 will be described. FIG. 3A shows a finder view state. FIG. 3B shows a live view state. Hereinafter, the description will be made under the condition that a power supply of the image pickup apparatus is turned on, and a still image photographing mode is selected.

First, in the finder view state shown in FIG. 3A, the movable mirror 12 enters the incident optical path, and the first curtain 14 and the second curtain 15 retract from the optical path. Light incident from an outside is reflected from the main mirror 12a to be incident upon the prism 17, while a part of the light passes through the main mirror 12a to be incident upon the sub-mirror 12b. The light incident upon the prism 17 is reflected a plurality of times in the prism, and output to an outside through the finder portion 18. The user can recognize an optical image signal visually by peering through the viewfinder 3 shown in FIG. 1.

Furthermore, a part of the incident light that has passed through the main mirror 12a is reflected from the sub-mirror 12b to be incident upon the AF sensor 19. The AF sensor 19 converts the incident light photoelectrically and outputs an electrical image signal. The electrical image signal output from the AF sensor 19 allows a control portion such as a microcomputer (not shown) to calculate a focal position and a focal length (defocus amount), thereby driving a focus lens (not shown) in the lens unit 2.

Next, in the live view state shown in FIG. 3B, the movable mirror 12 retracts from the incident optical path, and the first curtain 14 and the second curtain 15 also retract from the incident optical path. Thus, the light incident from the outside is incident upon the image pickup element 16 through the opening 13a of the shutter portion 13. At this time, the incident light is not incident upon the prism 17, the finder portion 18, and the AF sensor 19. The image pickup element 16 converts an incident optical image signal into an electrical image signal and outputs the resultant signal. The electrical image signal output from the image pickup element 16 is subjected to signal processings such as noise removal and size conversion by a signal processing microcomputer provided separately, and displayed as a through image on the monitor 4 (see FIG. 1) by a display control portion.

When the release button 6 is pressed halfway in the finder view state or the live view state, the AF operation and the AE operation are performed. The states of the movable mirror 12 and the shutter portion 13 at this time are as shown in FIGS. 3A and 3B. Furthermore, when the release button 6 is pressed fully in the finder view state or the live view state, a photographing operation is performed. At this time, in the shutter portion 13, the first curtain 14 retracts from the state where it is positioned on the optical path, and the second curtain 15 moves to the optical path while keeping a predetermined interval with respect to the first curtain 14. A detailed operation during photographing will be described later.

2. Configuration of a Shutter Unit

FIGS. 4A, 4B, 4C, 4D, and 4E are perspective views each showing a configuration of a shutter unit in Embodiment 1. In FIGS. 4A to 4E, a shutter unit 106 includes a first curtain 108 (first light shielding body), a second curtain 109 (second light shielding body), an opening 110, a light shielding body holding portion 111, a first holding portion 112, a second holding portion 113, and a shutter charge mechanism 114.

The first curtain 108 corresponds to the first curtain 14 in FIGS. 3A and 3B. The second curtain 109 corresponds to the second curtain 15 in FIGS. 3A and 3B. The first curtain 14 and the second curtain 15 independently are placed slidably in a direction represented by an arrow A or B.

The opening 110 is formed on an incident optical path and can be closed by the first curtain 108 or the second curtain 109. Although not shown, the image pickup element 16 (see FIG. 3A) is placed behind the opening 110, and the movable mirror 12 (see FIG. 3A) is placed in front of the opening 110.

The light shielding body holding portion 111 includes a first holding portion 112 and a second holding portion 113. The first holding portion 112 can hold the first curtain 108 while closing the opening 110. The second holding portion 113 can hold the second curtain 109 while opening the opening 110. In the present embodiment, the first holding portion 112 and the second holding portion 113 are composed of electromagnetic holding means such as a solenoid, and can hold the positions of the first curtain 108 and the second curtain 109 with a magnetic field generated by energizing the first and second holding portions 112 and 113. The first and second holding portions 112 and 113 may be composed of electrical or mechanical holding means instead of electromagnetic holding means.

Figure 4A:
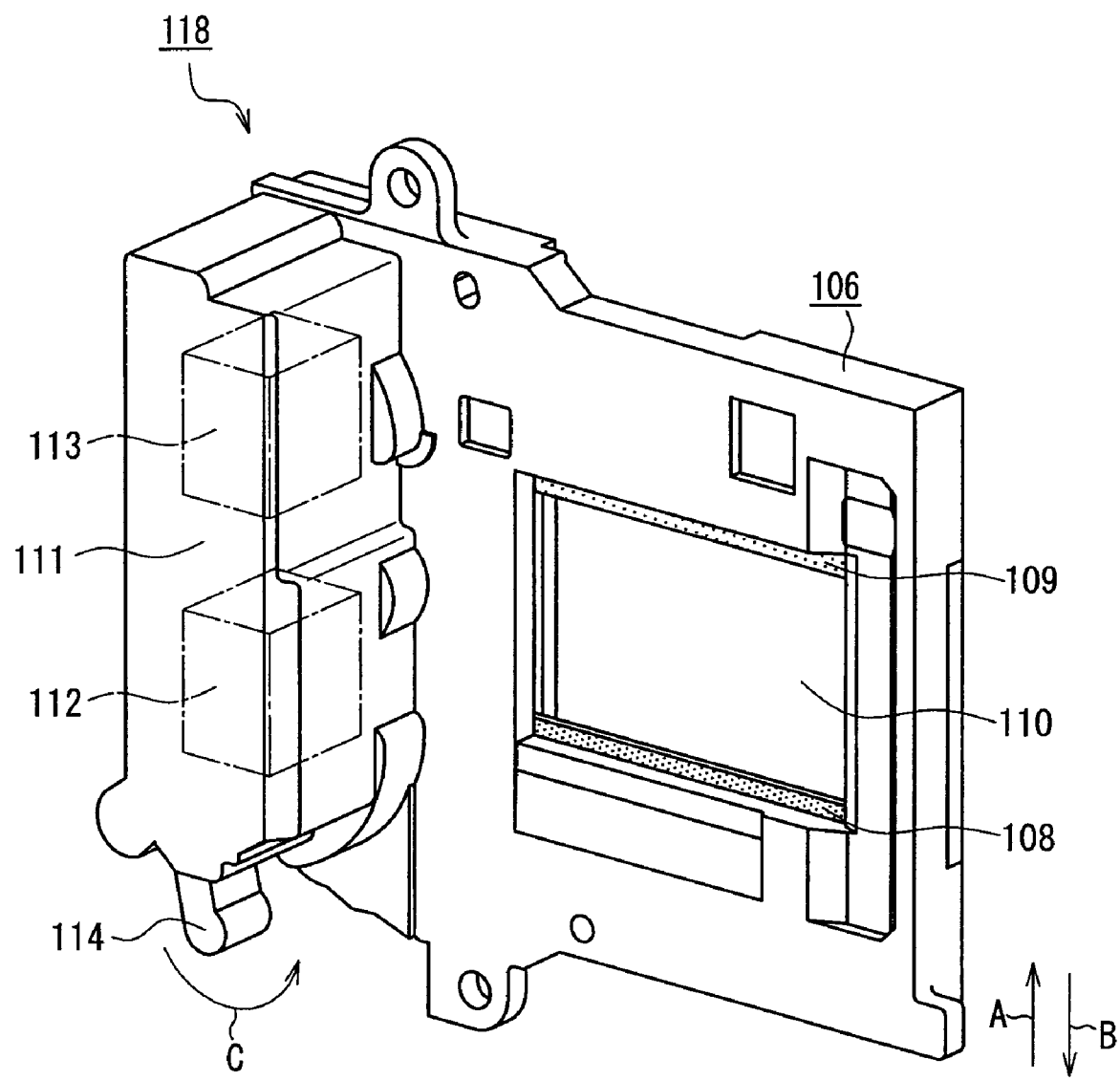
FIG. 4A is a perspective view showing a configuration of the shutter unit in Embodiment 1.

The shutter charge mechanism 114 slides the first curtain 108 and the second curtain 109 in a direction represented by the arrow A, and includes a lever placed on a lower surface of the light shielding body holding portion 111 so as to protrude as shown in FIG. 4A. The lever can rotate in a direction represented by an arrow C and a direction opposite thereto, and is biased at all times with elastic means such as a spring so as to return to the state shown in FIG. 4A. The first curtain 108 and the second curtain 109 can be slid in the direction represented by the arrow A by rotating the shutter charge mechanism 114 in the direction represented by the arrow C. More specifically, when the shutter charge mechanism 114 is rotated to an end (position where the rotation is regulated mechanically) in the direction represented by the arrow C, the first curtain 108 can be slid to a position of closing the opening 110. Furthermore, when the shutter charge mechanism 114 is rotated to an end in a direction opposite to the direction represented by the arrow C, the second curtain 109 can be moved to a position where the second curtain 109 retracts from the incident optical path. The shutter charge mechanism 114 is composed of the shown lever, and transmission means such as a gear train that transmits the rotation operation of the lever to the first curtain 108 and the second curtain 109. The description of a detailed configuration thereof will be omitted.

Next, a series of operations up to the exposure of the shutter unit will be described.

As described above, the shutter unit 106 includes the light shielding body holding portion 111. The light shielding body holding portion 111 contains the first holding portion 112, the second holding portion 113, and the shutter charge mechanism 114. The first holding portion 112 is connected to the first curtain 108 after the shutter charge mechanism 114 is released, thereby holding the first curtain 108 in a standby state at the light shielding position. The second holding portion 113 can be connected to the second curtain 109 to hold the second curtain 109 in a standby state on an upper side. The shutter charge mechanism 114 is set in front of the image pickup element 16 (see FIG. 3A), and can be connected to the first curtain 108 and the second curtain 109 to hold the first curtain 108 mechanically on a lower side and to hold the second curtain 109 mechanically on an upper side.

First, as shown in FIG. 4A, while the opening 110 is opened, the shutter charge mechanism 114 is charged mechanically, the first curtain 108 retracts downward, and the second curtain 109 retracts upward, whereby the opening 110 is opened. At this time, the first holding portion 112 and the second holding portion 113 are not energized.

Figure 4B:
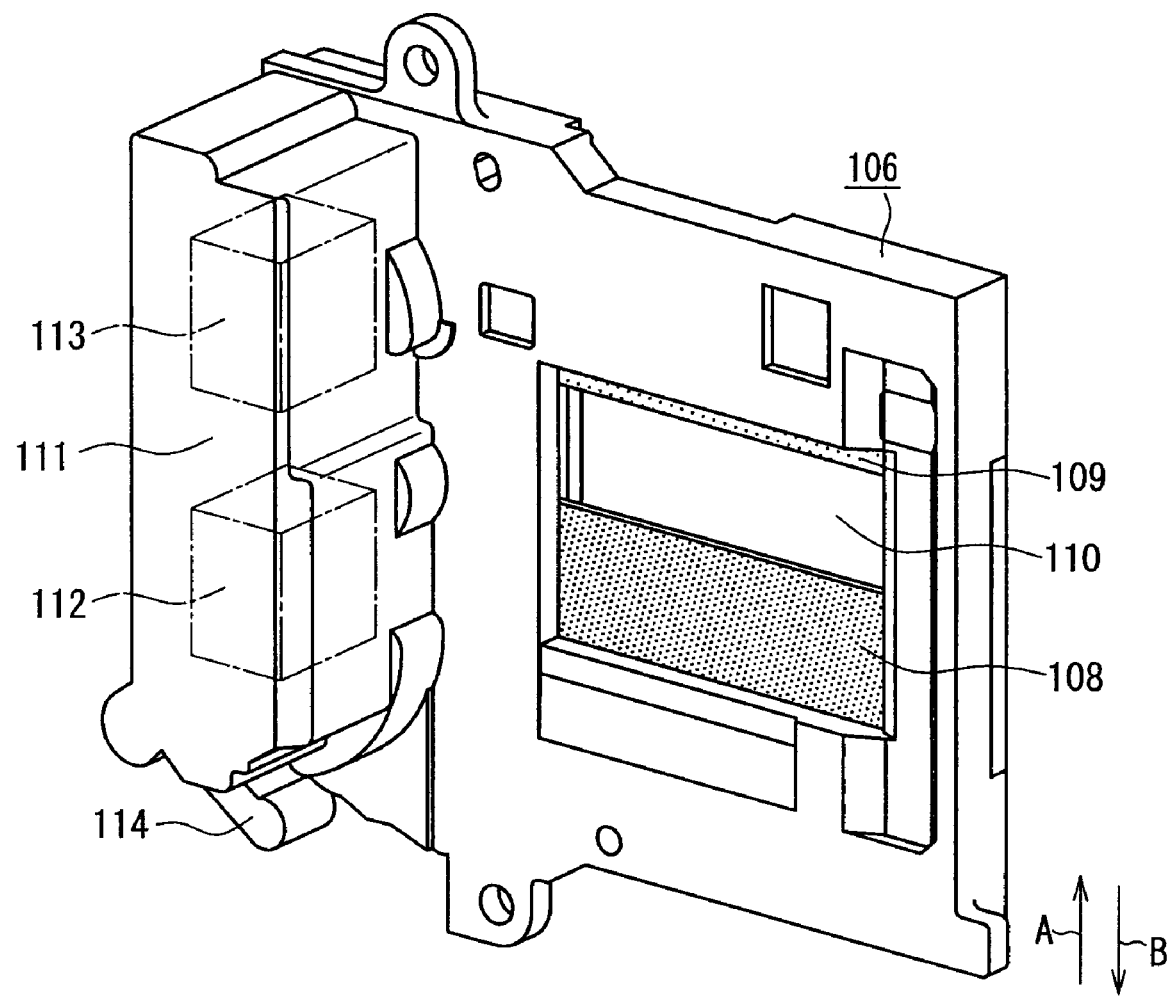
FIG. 4B is a perspective view showing a configuration of the shutter unit in Embodiment 1.

Next, FIG. 4B shows that the mechanical charge by the shutter charge mechanism 114 is being released, and the first curtain 108 moves upward from the lower retracting position as represented by the arrow A. The second curtain 109 keeps retracting on an upper side. At this time, the first holding portion 112 and the second holding portion 113 are energized.

Figure 4C:
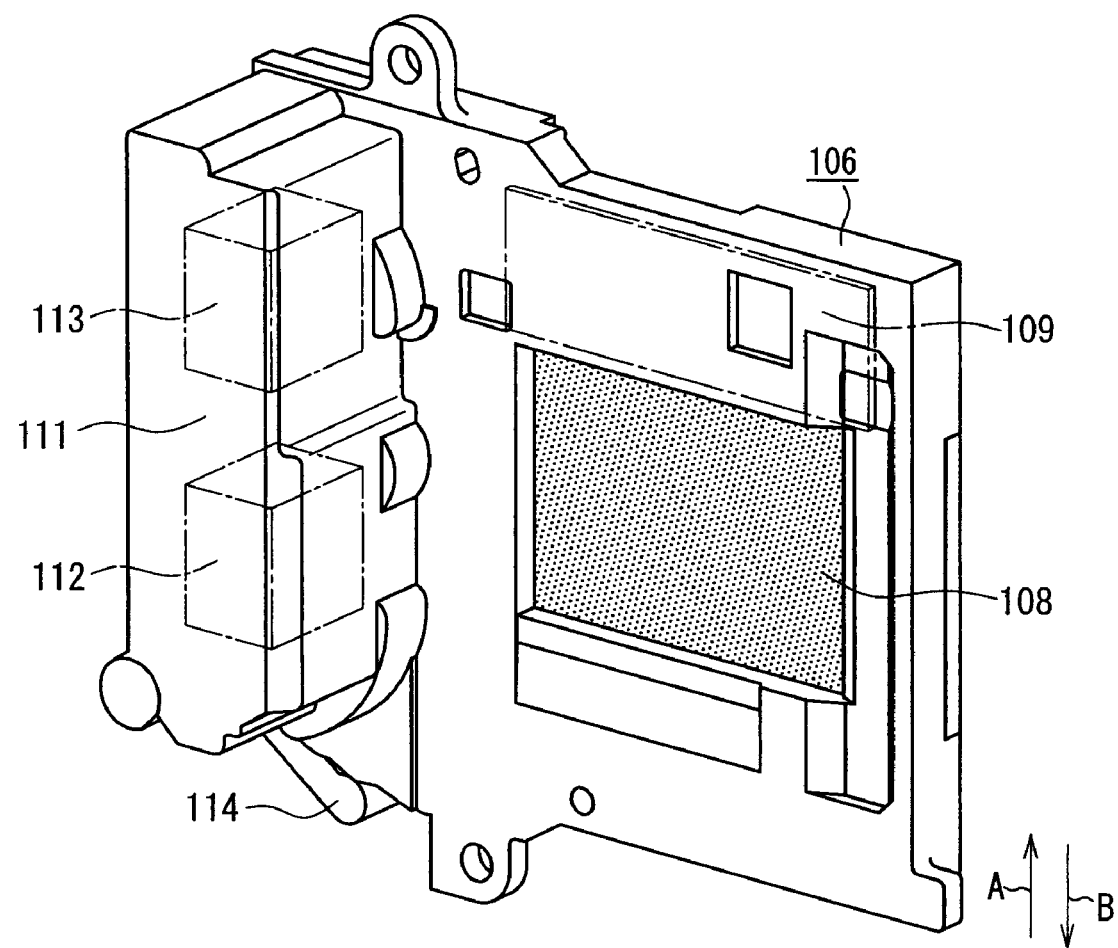
FIG. 4C is a perspective view showing a configuration of the shutter unit in Embodiment 1.

Next, FIG. 4C shows a state in which the charge release by the shutter charge mechanism 114 is completed. The first curtain 108 is held at a position where the first holding portion 112 shields the opening 110 against light. The second curtain 109 is held in a standby state on an upper side by the second holding portion 113.

Figure 4D:
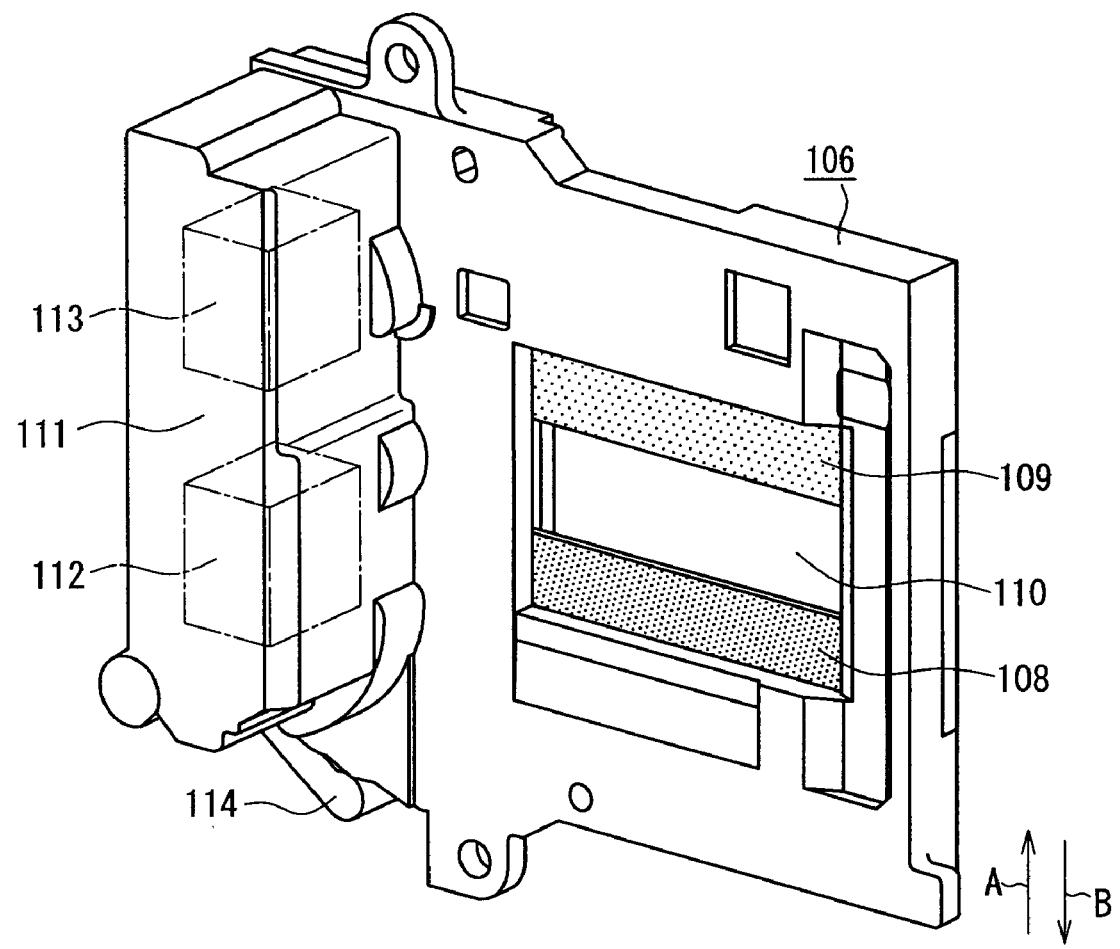
FIG. 4D is a perspective view showing a configuration of the shutter unit in Embodiment 1.
Figure 4E:
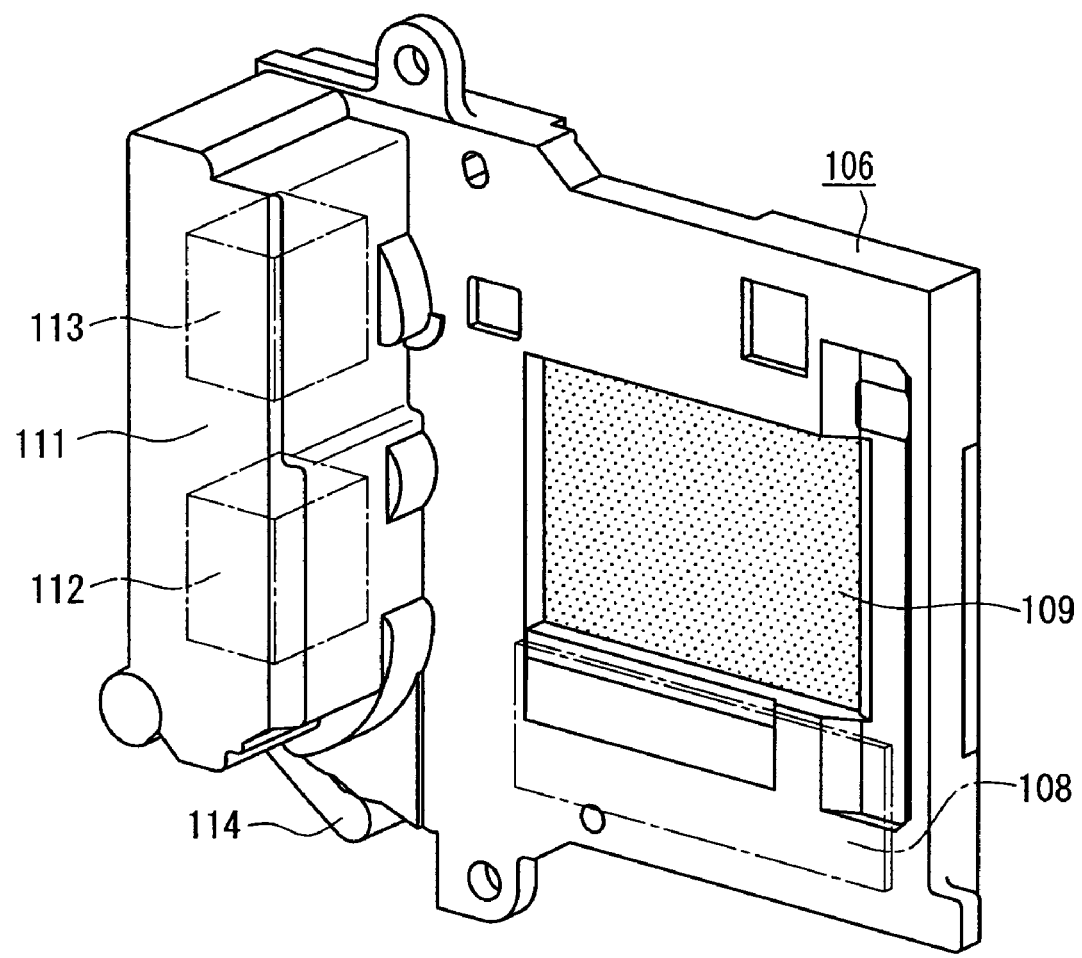
FIG. 4E is a perspective view showing a configuration of the shutter unit in Embodiment 1.

Next, the energization of the second holding portion 113 is cancelled after the elapse of an arbitrary period of time from the canceling of the energization of the first holding portion 112, whereby the first curtain 108 and the second curtain 109 move in a direction represented by the arrow B while keeping an arbitrary interval as shown in FIG. 4D to obtain a state shown in FIG. 4E. In the state shown in FIG. 4E, the first curtain 108 retracts downward, and the second curtain 109 shields the opening 110 against light.

Next, the mechanical charge is performed by the shutter charge mechanism 114, whereby the state shown in FIG. 4A can be obtained.

The photographing operation by the photographing apparatus can be performed by repeating the above series of operations.

3. Configuration and Operation of a Driving Unit

FIGS. 5A to 5D are plan views of a driving unit. The illustrated driving unit is placed in a case 119 in FIG. 2, and these figures show the internal structure thereof viewed from above. FIGS. 6A to 6E are plan views showing the driving unit viewed from a bottom surface side.

The movable mirror 12 is rotated with the mirror driving portion 115 connected to a cam block 200 via the gear train 117 (see FIG. 2), using the motor 116 (See FIG. 2) as a power source. Furthermore, the shutter charge operation by the shutter charge mechanism 114 is performed by the shutter driving portion 118 (see FIG. 4A) connected to the shutter charge mechanism 114 via the gear train 117, using the motor 116 as a power source.

The cam block 200 includes a first cam 201, a second cam 202, a third cam 203, a fourth cam 204, and a cam gear 205 integrally. The first cam 201 can drive the mirror driving mechanism (see FIG. 2). The second cam 202 can drive the shutter driving portion 118. On the outer circumference of the third cam 203, a first abutting portion 222, a second abutting portion 223, and a third abutting portion 224 that comes into contact with an engagement lever 206 to be engaged therewith are formed. The cam gear 205 can transmit the driving force of the motor 116. The fourth cam 204 can rotate a stop operation control lever 210 (see FIG. 6A). Furthermore, the cam block 200 can rotate in a direction represented by an arrow D (clockwise direction) with respect to a rotation shaft 207.

[3-1. Shift to a Live View State]

Figure 5A:
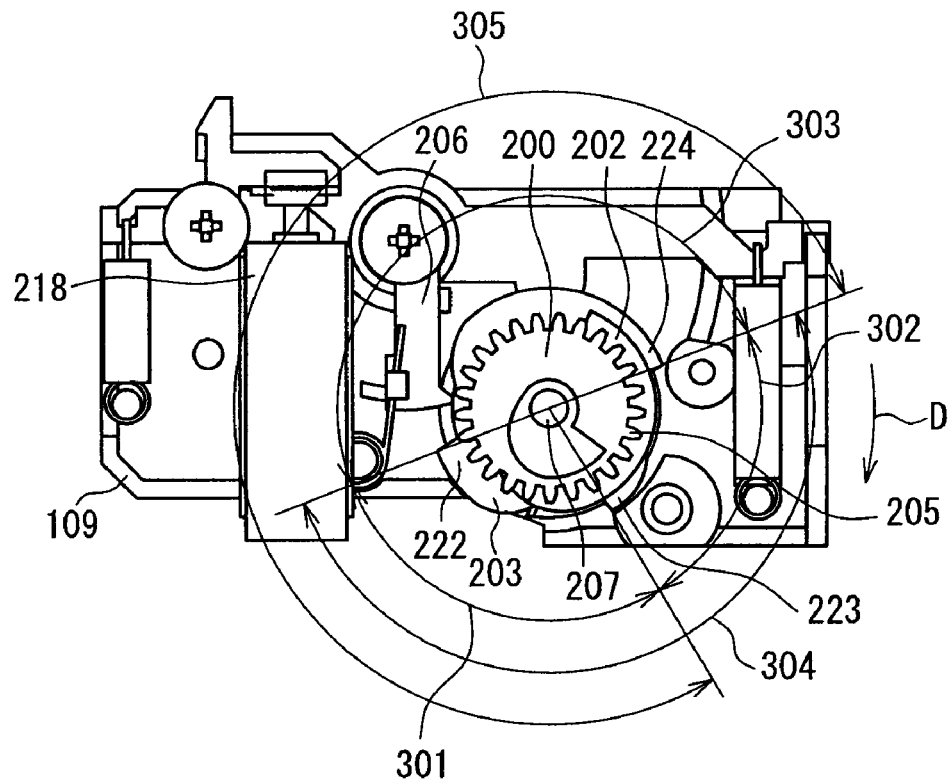
FIG. 5A is a plan view showing a configuration of a driving unit in Embodiment 1 viewed from an upper surface side.
Figure 5B:
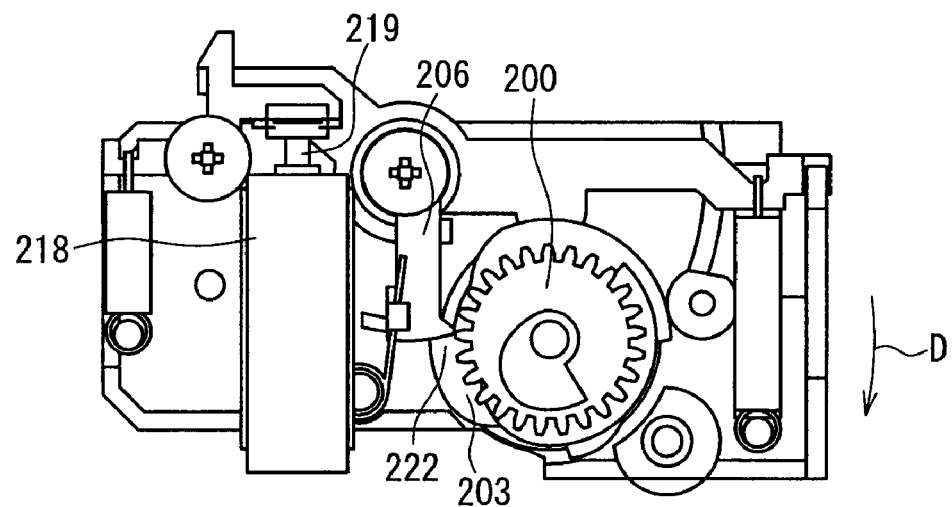
FIG. 5B is a plan view showing a configuration of the driving unit in Embodiment 1 viewed from the upper surface side.
Figure 6A:
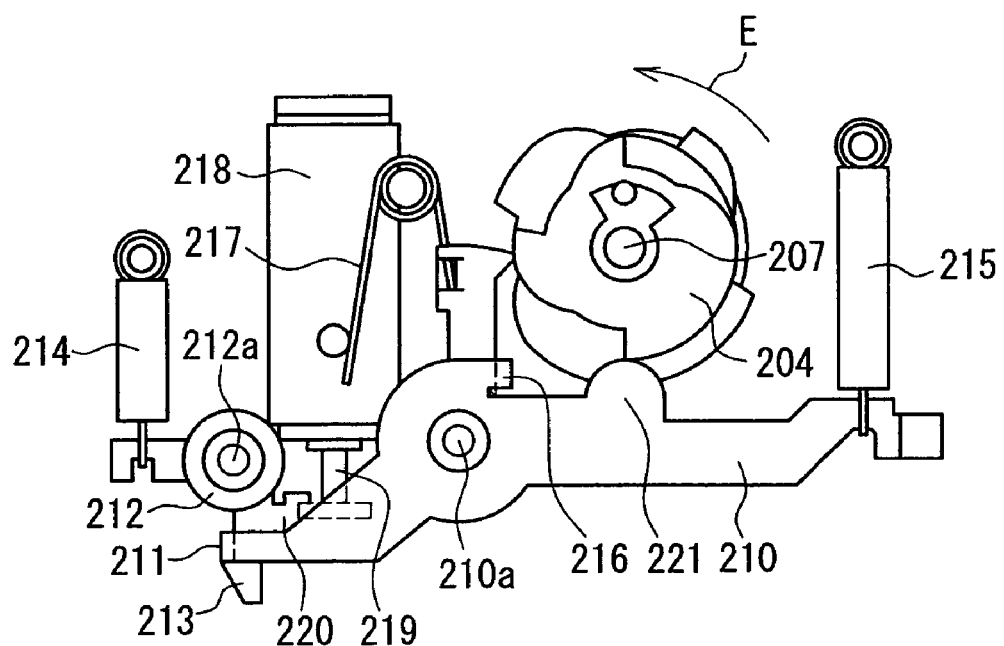
FIG. 6A is a plan view showing a configuration of the driving unit in Embodiment 1 viewed from a bottom surface side.
Figure 6B:
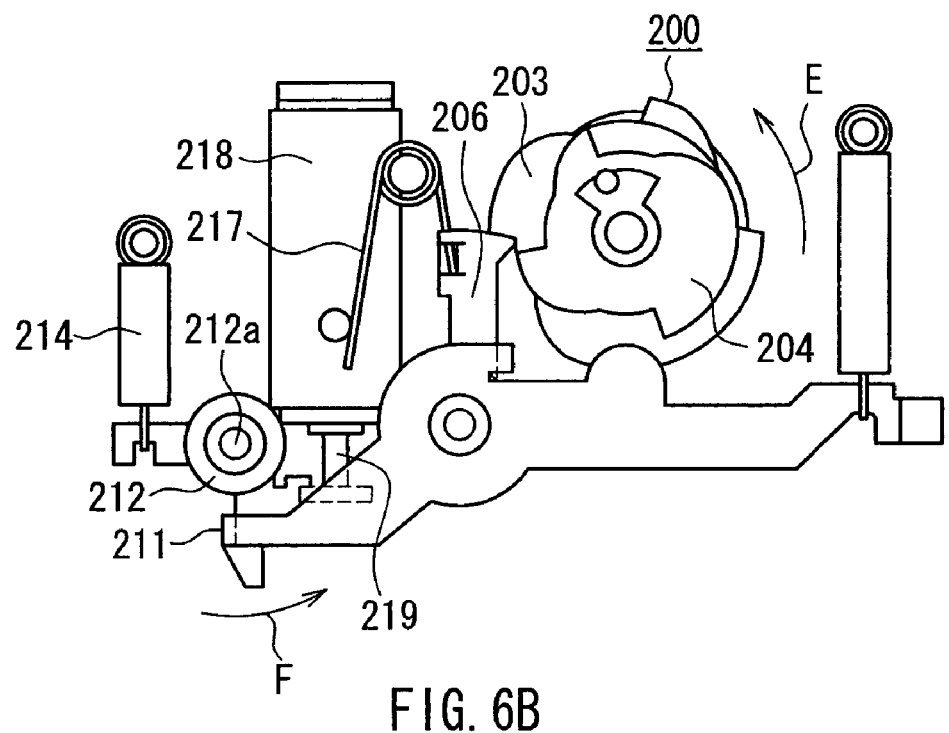
FIG. 6B is a plan view showing a configuration of the driving unit in Embodiment 1 viewed from the bottom surface side.

In FIGS. 5A and 6A, when the cam block 200 rotates in the arrow D direction (n a direction represented by an arrow E from the position shown in FIG. 6A), and reaches a first stop position shown in FIGS. 5B and 6B, the first abutting portion 222 formed in the third cam 203 abuts against the engagement lever 206, whereby the rotation of the cam block 200 stops. The first stop position shown in FIGS. 5B and 6B corresponds to a position (finder view state) at which the movable mirror 12 enters an incident optical path as shown in FIG. 3A, and the shutter unit 14 is in a mechanically charged state and the shutter is opened. At this time, the first holding portion 112 and the second holding portion 113 shown in FIG. 4A are not energized.

Next, a solenoid 218 is energized at the first stop position shown in FIGS. 5B and 6B, whereby a solenoid iron core 219 is attracted to the solenoid body 218 side. At this time, as shown in FIG. 6B, the solenoid iron core 219 is engaged with a second lock lever engagement portion 220. Therefore, a lock lever 212 rotates with respect to a rotation shaft 212a in a direction (arrow F direction) of leaving the first stop operation control lever engagement portion 211 provided in the stop operation control lever 210. The state after the rotation is shown in FIGS. 5C and 6C.

Figure 5C:
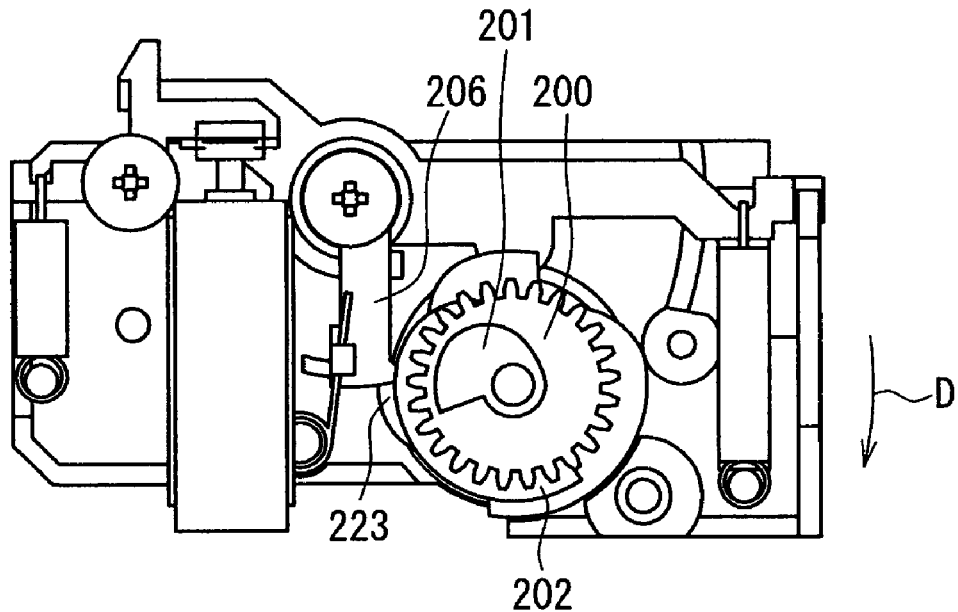
FIG. 5C is a plan view showing a configuration of the driving unit in Embodiment 1 viewed from the upper surface side.
Figure 6C:
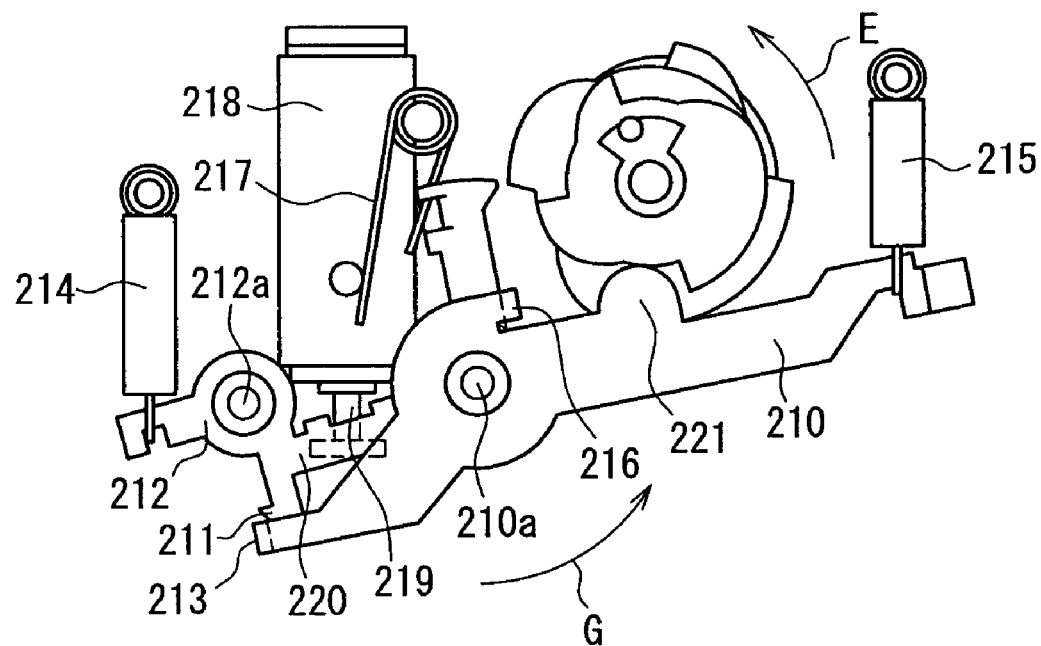
FIG. 6C is a plan view showing a configuration of the driving unit in Embodiment 1 viewed from the bottom surface side.

As shown in FIGS. 5C and 6C, when the first stop operation control lever engagement portion 211 is released from the second lock lever engagement portion 220, the stop operation control lever 210 rotates in a direction represented by an arrow G (direction in which the stop operation control lever abutting portion 221 abuts against the fourth cam 204) with the action of a stop operation control lever spring 215. At this time, the engagement lever 206 is biased with an engagement lever spring 217 in a direction of approaching the third cam 203, and simultaneously, the rotation of the engagement lever 206 is inhibited by a second stop operation control lever engagement portion 216. Therefore, the engagement lever 206 rotates to a lock release position (position shown in FIG. 6C) integrally with the stop operation control lever 210.

Figure 5D:
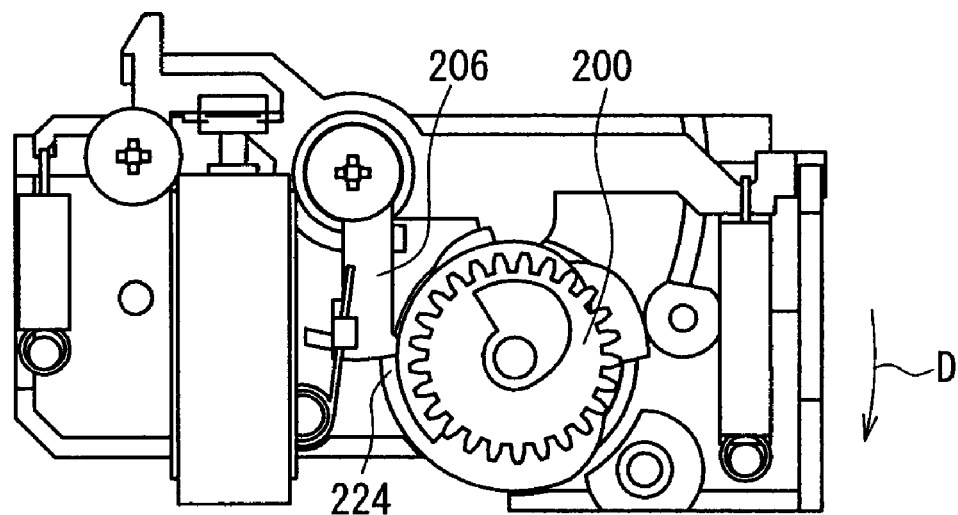
FIG. 5D is a plan view showing a configuration of the driving unit in Embodiment 1 viewed from the upper surface side.
Figure 6D:
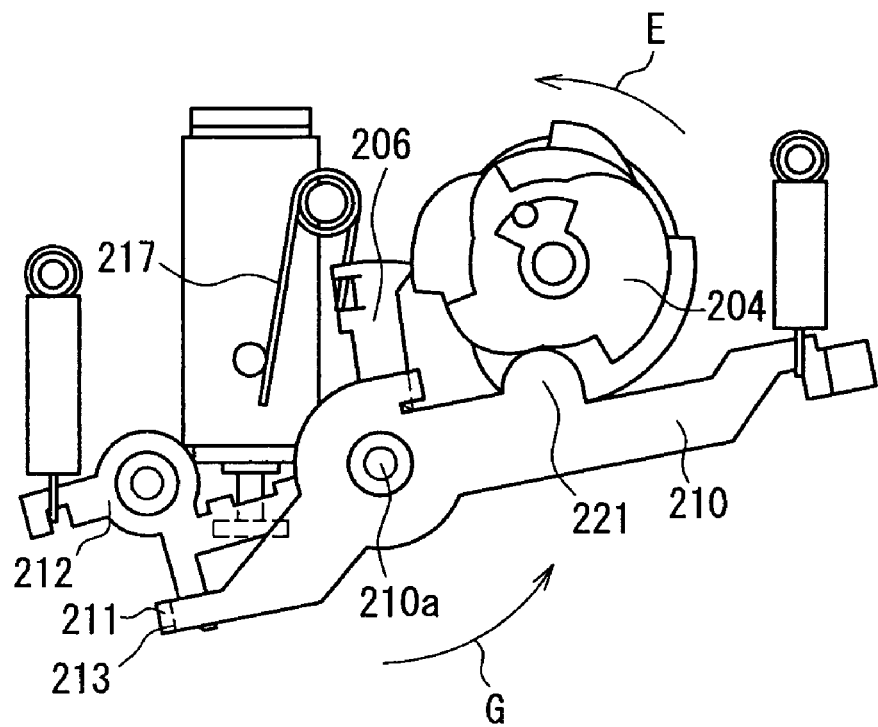
FIG. 6D is a plan view showing a configuration of the driving unit in Embodiment 1 viewed from the bottom surface side.

Next, as shown in FIGS. 5D and 6D, the motor 116 rotates the cam gear 205 via the gear train 117 while the lock between the engagement lever 206 and the fourth cam 204 is released, whereby a stop operation control lever abutting portion 221 is pushed up with the fourth cam 204, and the stop operation control lever 210 rotates in the arrow G direction with respect to a rotation shaft 210a, in which the first stop operation control lever engagement portion 211 is engaged with the first lock lever engagement portion 213. Since the engagement lever 206 is biased in a direction of abutting against the third cam 203 with the engagement lever spring 217, the engagement lever 206 rotates in a direction of abutting against the third cam 203 integrally with the stop operation control lever 210.

Figure 6E:
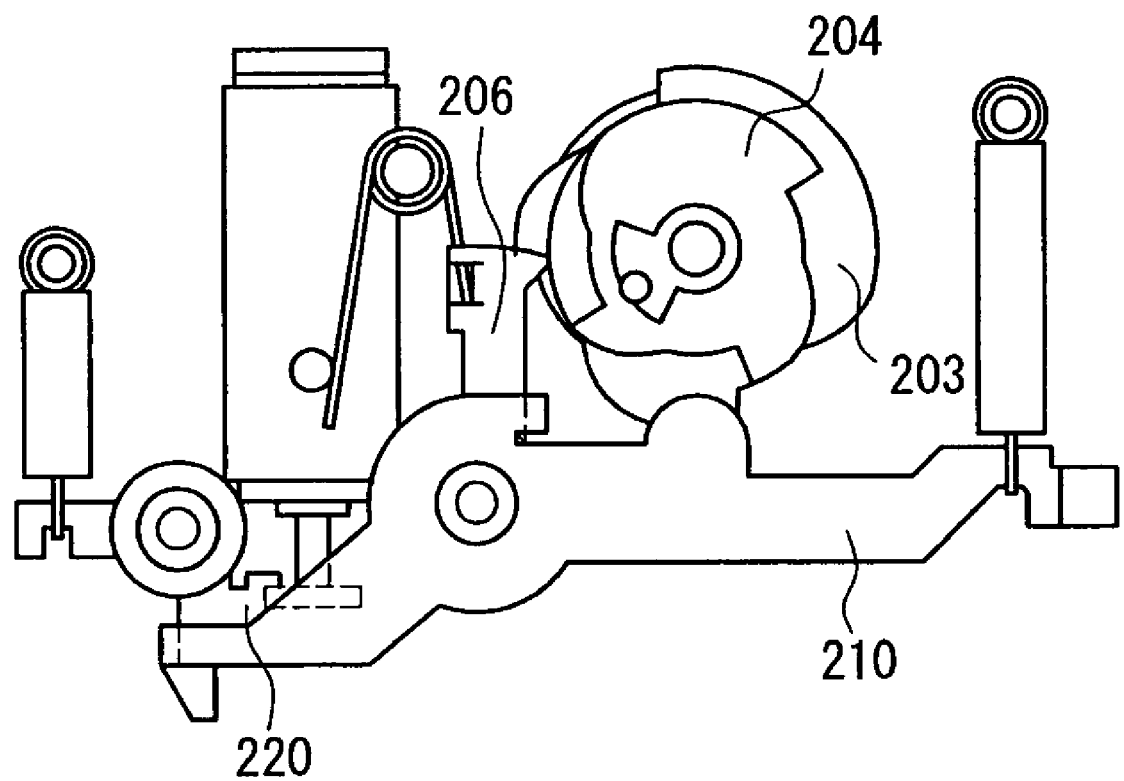
FIG. 6E is a plan view showing a configuration of the driving unit in Embodiment 1 viewed from the bottom surface side.

Furthermore, after the engagement lever 206 starts rotating, the energization of the solenoid 218 is cancelled before the engagement lever 206 reaches a subsequent stop position. Next, the cam block 200 rotates, whereby the first lock lever engagement portion 213 and the first stop operation control lever engagement portion 211 are engaged with each other. The stop operation control lever abutting portion 221 of the stop operation control lever 210 is held without dropping in a concave of the third cam 203 as shown in FIG. 6E, so that the engagement lever 206 abuts against the second abutting portion 223 formed on the third cam 203, thereby inhibiting the rotation of the cam block 200.

The solenoid 218 is continued to be energized during the passage through the stop position. Therefore, even if the fourth cam 204 abuts against the stop operation control lever abutting portion 211, and the stop operation control lever 210 rotates at the stop position, the stop operation control lever abutting portion 221 does not drop in the concave of the fourth cam 204 to be engaged with the first lock lever engagement portion 213 and the first stop operation control lever engagement portion 211 at a subsequent stop position. Thus, the operation can be performed without stopping at a particular stop position.

During a first operation period 301 in which the cam block 200 moves from the first stop position to the second position, the movable mirror 12 shown in FIG. 2 rotates to an upper exposure retracting position. Furthermore, the shutter unit 106 shown in FIG. 4A is mechanically charged while the first holding portion 112 and the second holding portion 113 are not energized. At this time, the first curtain 108 retracts downward and the second curtain 109 retracts upward, whereby the opening 110 is formed. Thus, as shown in FIG. 3B, incident light can reach the image pickup element 16 without being blocked by the movable mirror 12, and an image based on an image signal obtained from the image pickup element 16 can be displayed on the monitor 4 (see FIG. 1) in a live view state.

[3-2. Exposure]

In the same way as in the above, the engagement state between the engagement lever 206 and the cam block 200 is cancelled, and the cam block 200 is stopped at a third stop position as shown in FIGS. 5D and 6D. During a second operation period 302 (see FIG. 5A) in which the second stop position is shifted to the third stop position, the movable mirror 103 rotates to an upper exposure retracting position as shown in FIG. 3B. Next, the shutter unit 106 energizes the first holding portion 112 and the second holding portion 113, and thereafter, cancels the mechanical charge. In synchronization with the cancel operation, the first curtain 108 moves upward from a lower standby position, thereby covering the opening 110 completely as shown in FIG. 4C.

At the third stop position shown in FIGS. 5D and 6D, first, the energization of the first holding portion 112 is cancelled, whereby the first curtain 108 starts moving downward. Then, upon the energization of the second holding portion 113 is cancelled after the elapse of a predetermined period of time, the second curtain 109 starts moving downward. FIG. 4D shows a state while the first curtain 108 and the second curtain 109 are moving downward. At this time, the difference between the time when the first curtain 108 passes through an arbitrary position and the time when the second curtain 109 passes through the arbitrary position becomes an exposure time.

After the completion of the exposure, as shown in FIG. 4E, the first curtain 108 retracts downward, and the second curtain 109 covers the opening 110.

[3-3. Shift to a Finder View State]

In the same way as in the above, the engagement state between the engagement lever 206 and the cam block 200 is cancelled, whereby the cam block 200 stops at the first stop position as shown in FIGS. 5B and 6B. During a third operation period 303 in which the third stop position 209 is shifted to the first stop position 207, the movable mirror 12 rotates to a finder observation position as shown in FIG. 3A. Furthermore, as shown in FIG. 4A, the shutter unit 106 is mechanically charged, the first curtain 108 retracts downward, and the second curtain 109 retracts upward, whereby the opening 110 is formed.

As shown in FIG. 3A, in order to photograph a subject while the movable mirror 12 is placed in an incident optical path as shown in FIG. 3A, and an optical image is recognized visually through the finder portion 18, the cam block 200 is rotated in a range shown in a fourth operation period to reach the third stop position, and thereafter, the above exposure is performed during the third operation period. During the fourth operation period, the cam block 200 reaches the third stop position (FIGS. 5D and 6D) from the first stop position (FIGS. 5B and 6B) without stopping at the second stop position (FIGS. 5C and 6C). After the exposure, the cam block 200 is rotated so as to reach the first stop position, whereby a finder view state can be obtained. While the cam block 200 is at the first stop position, photographing can be continued while an optical image is recognized visually through the finder portion.

During live view photographing, the cam block 200 is rotated in a fifth operation range, whereby the above exposure is performed. During the fifth operation period, the cam block 200 reaches the second stop position from the third stop position without stopping at the first stop position. This enables live view photographing to be continued. Thus, according to the present invention, photographing is limited to a live view state, omitting the photographing function in a finder view state, whereby a smaller image pickup apparatus without the movable mirror 12 and the mirror driving portion 115 also can be produced.

[4. Specific Photographing Operation of an Image Pickup Apparatus]

Next, a specific photographing operation control in the image pickup apparatus in Embodiment 1 will be described. Although the photographing operation (exposure) has been described, it will be described in more detail using an operation flow.

Figure 7:
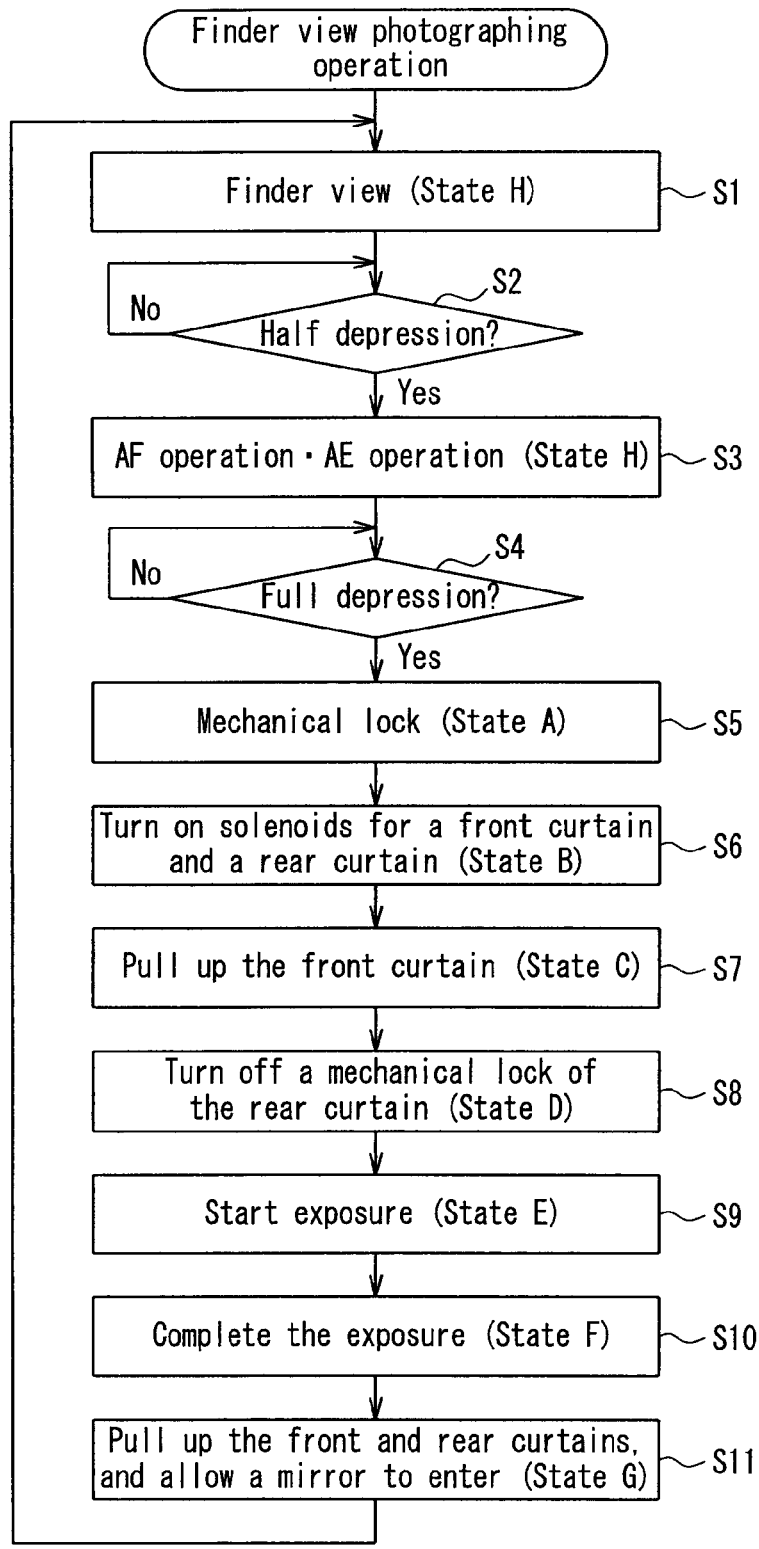
FIG. 7 is a flowchart showing an operation in a finder view mode in Embodiment 1.
Figure 8:
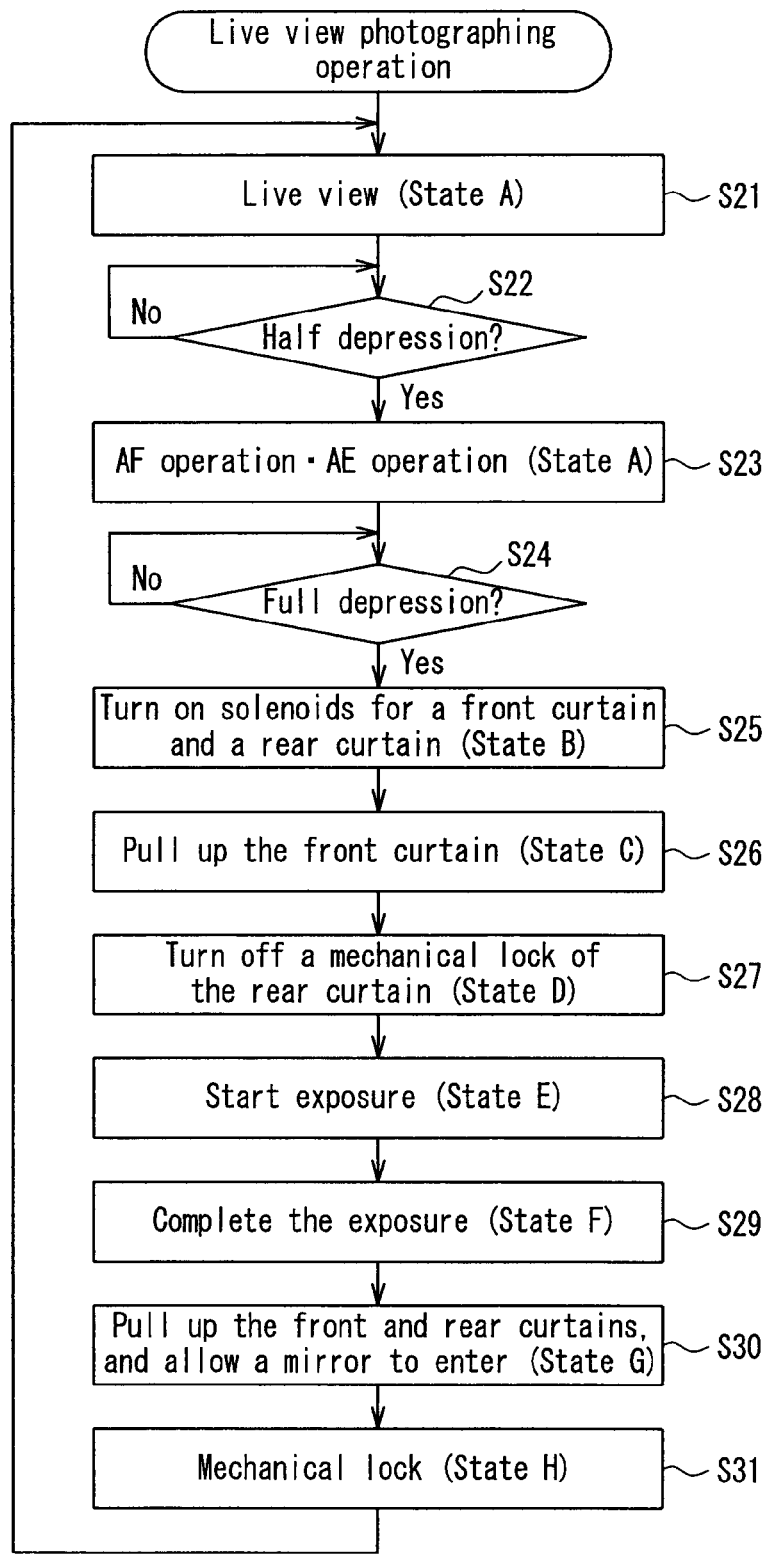
FIG. 8 is a flowchart showing an operation in a live view mode in Embodiment 1.

FIG. 7 is a photographing operation flow in a finder view state. FIG. 8 is a photographing operation flow in a live view state. FIGS. 9A-9H are block diagrams showing a configuration of a driving control portion capable of performing the driving control of the movable mirror and the shutter. FIGS. 10A-10H are schematic views showing a flow of the mechanical operation of each portion during a photographing operation in a finder view state. FIGS. 11A-11H are schematic views showing a flow of the mechanical operation of each portion during a photographing operation in a live view state. Each step in FIGS. 7 and 8, the state shown in each of FIGS. 9A-9H, and the state shown in each of FIGS. 10A-10H and each of FIGS. 11A-11H are associated, and the detailed relationship thereof will be described later. Letters such as "A" to "H" in a "state A" to a "state H" shown in FIGS. 7 and 8 are associated with letters such as "A" to "H" in FIGS. 9A-9H.

As shown in FIGS. 9A-9H, the photographing apparatus includes a motor 401, a mode switch portion 402, a first and second curtain driving mechanism 403, a mechanical lock mechanism 404, a solenoid for a first curtain 405, a solenoid for a second curtain 406, a first curtain 407, a second curtain 408, a mirror driving mechanism 409, a movable mirror 410, a Prism 411, an AF sensor 412, an image pickup element 413, and a cam block 414. It should be noted that a first and second curtain driving mechanism 503, a first curtain 507, a second curtain 508, a mirror driving mechanism 509, a movable mirror 510, a main mirror 510a, a sub-mirror 510b, a Prism 511, an AF sensor 512, and an image pickup element 513 in FIGS. 10A-10H and FIGS. 11A-11H schematically show components having the same names in FIGS. 9A-9H, and they are substantially the same as those shown in FIGS. 9A-9H.

The motor 401 is a driving source for driving a shutter and a movable mirror. The motor 401 corresponds to the motor 116 in FIG. 2 and the like. Furthermore, although the motor 401 can be composed of a DC motor, a stepping motor, an ultrasound motor, or the like, the stepping motor is preferred in order to repeat the operation and stop at a rotation angle with a high precision.

The mode switch portion 402 (driving mechanism) transmits the driving force from the motor 401 to both or either one of the first and second curtain driving mechanism 403 and the mirror driving mechanism 409. More specifically, while the mode switch portion 402 outputs an ON signal to the first and second curtain driving mechanism 403, the first and second curtain driving mechanism 403 outputs an ON signal to the first curtain 407 and the second curtain 408. The mode switch portion 402 corresponds to the cam block 200 in FIGS. 5 and 6.

The first and second curtain driving mechanism 403 (shutter driving means) can drive the first curtain 407 and the second curtain 408 so that they slide in one direction by the control from the mode switch portion 402. In the present embodiment, when the first and second curtain driving mechanism 403 outputs an ON signal to the first curtain 407 and the second curtain 408, the first curtain 408 is moved to the first position, and the second curtain 408 is moved to the second position. The first and second curtain driving mechanism 403 corresponds to the shutter charge portion 114 in FIG. 4.

The mechanical lock mechanism 404 (holding means) can mechanically lock the driving of the second curtain 408. In the present embodiment, when the mechanical lock mechanism 404 is in an ON state, the second curtain 408 can be locked at a position where the second curtain 408 retracts from incident light L. The mechanical lock mechanism 404 corresponds to the stop operation control lever 210 and the lock lever 212 in FIG. 6.

The solenoid for a first curtain 405 can hold the first curtain 407 with an electromagnetic force so as to keep the state in which the first curtain 407 is positioned in an optical path of the incident light L. The solenoid for a first curtain 405 corresponds to the first holding portion 112 in FIG. 4. Furthermore, as shown in FIGS. 10A-10H and FIGS. 11A-11H, the solenoid for a first curtain 505 includes the first switch 505a, and the first switch 505a is turned on, whereby the solenoid is energized to generate an attracting force, and the first curtain 507 is held at the first position with the attracting force.

The solenoid for a second curtain 406 can hold the second curtain 408 with an electromagnetic force so as to keep the state in which the second curtain 408 retracts from the optical path of the incident light L. The solenoid for a second curtain 40 corresponds to the second holding portion 113 in FIG. 4. Furthermore, as shown in FIGS. 10 and 11, the solenoid for a second curtain 506 includes a second switch 506a. The second switch 506a is turned on, whereby the solenoid for a second curtain 506 is energized to generate an attracting force, and the second curtain 508 is held at the second position.

The first curtain 407 and the second curtain 408 are placed slidably between the first position at which they are placed in the optical path of the incident light L so as to prevent the incident light from being incident upon the image pickup element 413 and the second position at which they retract from the optical path of the incident light L so as to allow the incident light to be incident upon the image pickup element 413. The first curtain 407 and the second curtain 408 are driven with the first and second curtain driving mechanism 403. When the first and second curtain driving mechanism 403 inputs an ON signal, the first curtain 407 moves to the first position, and the second curtain 408 moves to the second position. Furthermore, when the first and second curtain driving mechanism 403 inputs an OFF signal, the first curtain 407 moves to the second position and the second curtain 408 moves to the first position.

When receiving an ON signal from the mode switch portion 402, the mirror driving mechanism 409 (mirror driving means) moves the movable mirror 410 to the optical path of the incident light L, and when receiving an OFF signal from the mode switch portion 402, the mirror driving mechanism 409 moves the movable mirror 410 to a position where the movable mirror 410 retracts from the optical path of the incident light L.

The movable mirror 410 is composed of a main mirror 410a and a sub-mirror 410b, and is configured so as to move between the state in which the movable mirror 410 is placed in the optical path of the incident light L and the state in which the movable mirror 410 retracts from the optical path of the incident light L, based on the driving control from the mirror driving mechanism 409. The main mirror 410a reflects the incident light to the Prism 411 side, and the sub-mirror 410b reflects the incident light to the AF sensor 412 side. The movable mirror 410 corresponds to the movable mirror 12 in FIG. 3.

The Prism 411 reflects the incident light L reflected from the main mirror 410a inside the Prism 411, and guides the incident light L to the finder portion 18 (see FIG. 2) side. The Prism 411 corresponds to the Prism 17 in FIG. 3.

The AF sensor 412 receives the incident light L reflected from the sub-mirror 410b and converts it photoelectrically to output an electrical image signal, and a defocus amount is calculated based on the electrical image signal output from the AF sensor, whereby AF control can be performed. The AF sensor 412 corresponds to the AF sensor 19 in FIG. 3.

When receiving the incident light L, the image pickup element 413 (image pickup means) converts an optical image signal to an electrical image signal to output it. The image pickup element 413 is composed of a CCD image sensor and a CMOS image sensor. The image pickup element 413 corresponds to the image pickup element 16 in FIG. 13.

In FIGS. 10A-10H and 11A-11H, a cam for driving a mirror includes a first cam 502a and a first cam follower 502b. Furthermore, a cam for driving a shutter includes a second cam 502c and a second cam follower 502d.

The first cam 502a is rotated by the motor 401 (see FIG. 9), and is provided with a cam surface whose distance from a rotation shaft is not constant. The first cam 502a is rotated while the first cam follower 502b abuts against the cam surface, whereby the first cam follower 502b moves in a radial direction of the first cam 502a to rotate the movable mirror 510.

One end of the first cam follower 502b abuts against the first cam 502a, and the other end thereof is connected to the mirror driving mechanism 509. The first cam follower 502b can move in the radial direction of the first cam 502a along the cam surface of the first cam 502a. The first cam follower 502b moves to a position (outer circumferential side of the first cam 502a) at a predetermined distance from the rotation shaft of the first cam 502a to be turned on, and outputs an ON signal with respect to the mirror driving mechanism 509. Furthermore, the first cam follower 502b moves to a position (inner circumference side of the first cam 502a) of approaching the rotation shaft of the first cam 502a by a predetermined amount to be turned off, and outputs an OFF signal with respect to the mirror driving mechanism 509.

The second cam 502c is rotated by the motor 401 (see FIG. 9), and is provided with a cam surface whose distance from the rotation shaft is not constant. The second cam 502c is rotated while the second cam follower 502d abuts against the cam surface, whereby the second cam follower 502d moves in a radial direction of the second cam 502c, and a shutter charge operation can be performed.

One end of the second cam follower 502d abuts against the second cam 502c, and the other end thereof is connected to the first and second curtain driving mechanism 503. The second cam follower 502d is movable in the radial direction of the second cam 502c along the cam surface of the second cam 502c. The second cam follower 502d moves to a position (outer circumferential side of the second cam 502c) at a predetermined distance from the rotation shaft of the second cam 502c to be turned off, and outputs an OFF signal with respect to the first and second curtain driving mechanism 503. Furthermore, the second cam follower 502d moves to a position (inner circumferential side of the second cam 502c) approaching the rotation shaft of the second cam 502c by a predetermined amount to be turned on, and outputs an ON signal with respect to the first and second curtain driving mechanism 503.

A cam block 514 corresponds to the cam block 200 shown in FIGS. 5A-5D and 6A-6E. In the cam block 514, although a plurality of cams first to fourth cams) are formed integrally as described above, two independent cams respectively are illustrated for convenience of the description, as shown in FIGS. 10A-10H and 11A-11H.

Although not shown, in FIGS. 9A-9H, the instruction and operation control with respect to each portion such as the motor 401 and the mode switch portion 402 is performed by the control microcomputer (control means) placed separately. Similarly, the instruction and operation control with respect to each portion in FIGS. 10A-10H and 11A-11H are performed by the control microcomputer (control means).

Figure 9A:
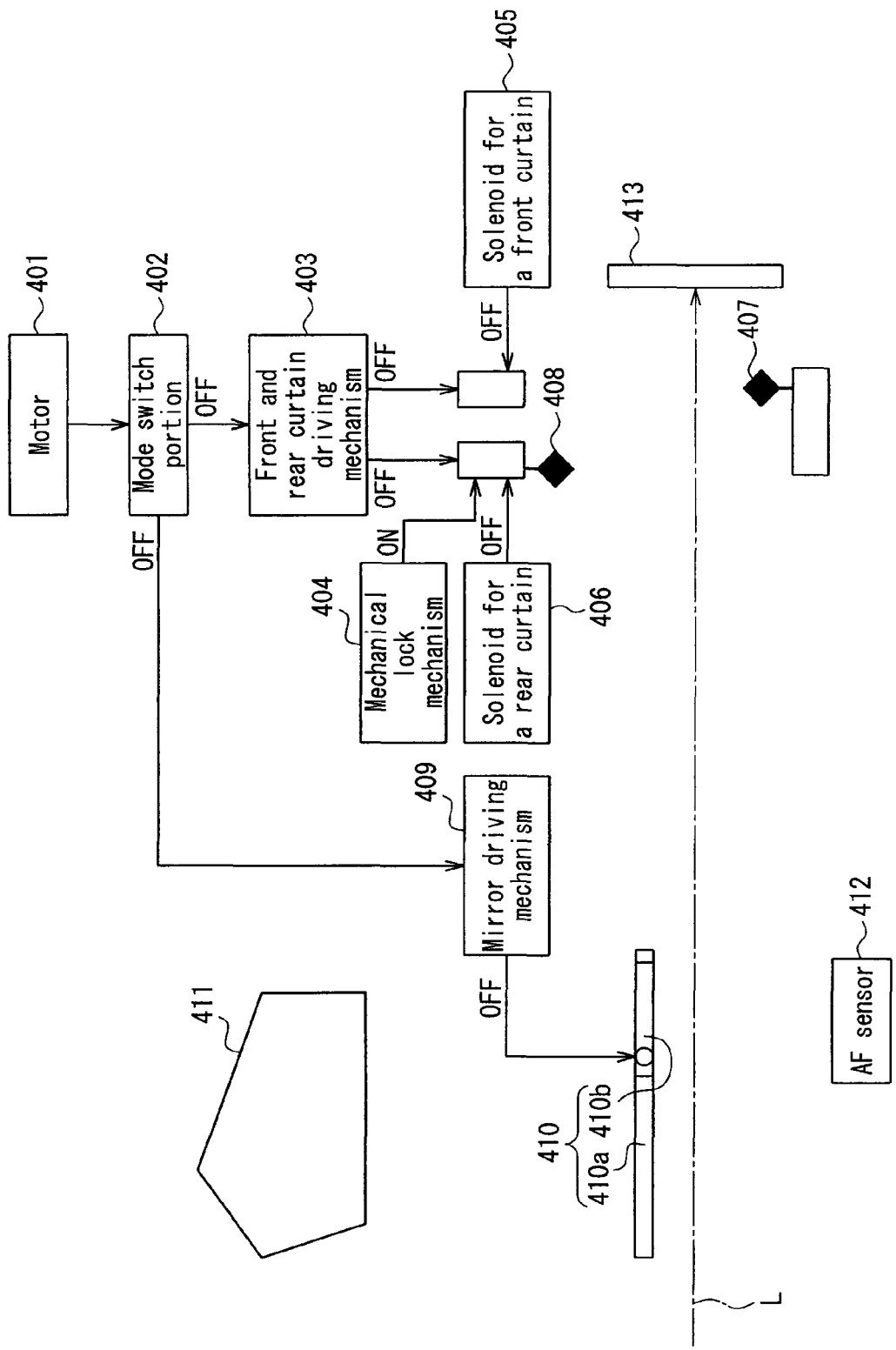
FIG. 9A is a schematic view showing an operation of an image pickup apparatus in Embodiment 1.
Figure 9B:
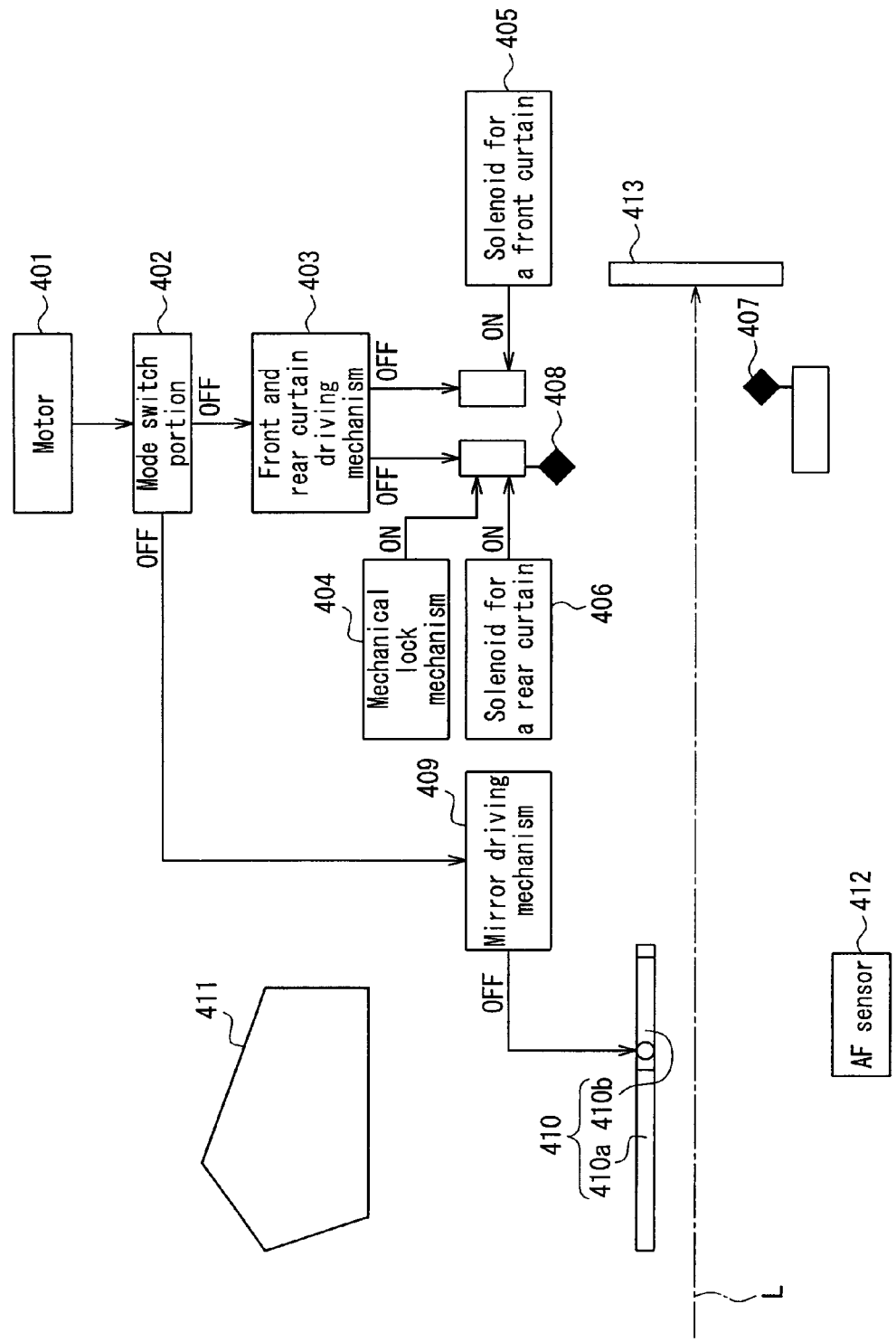
FIG. 9B is a schematic view showing an operation of the image pickup apparatus in Embodiment 1.
Figure 9C:
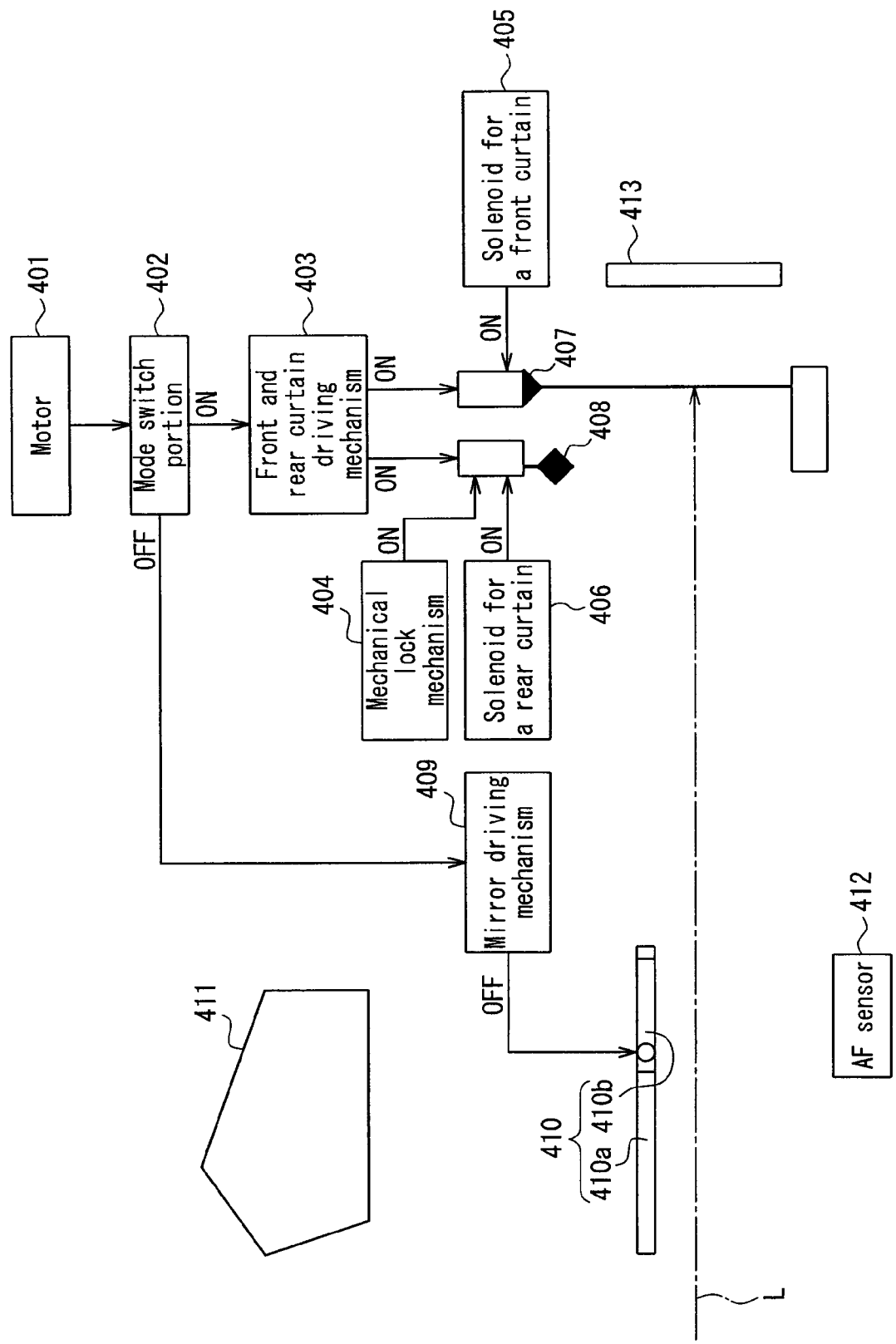
FIG. 9C is a schematic view showing an operation of the image pickup apparatus in Embodiment 1.
Figure 9D:
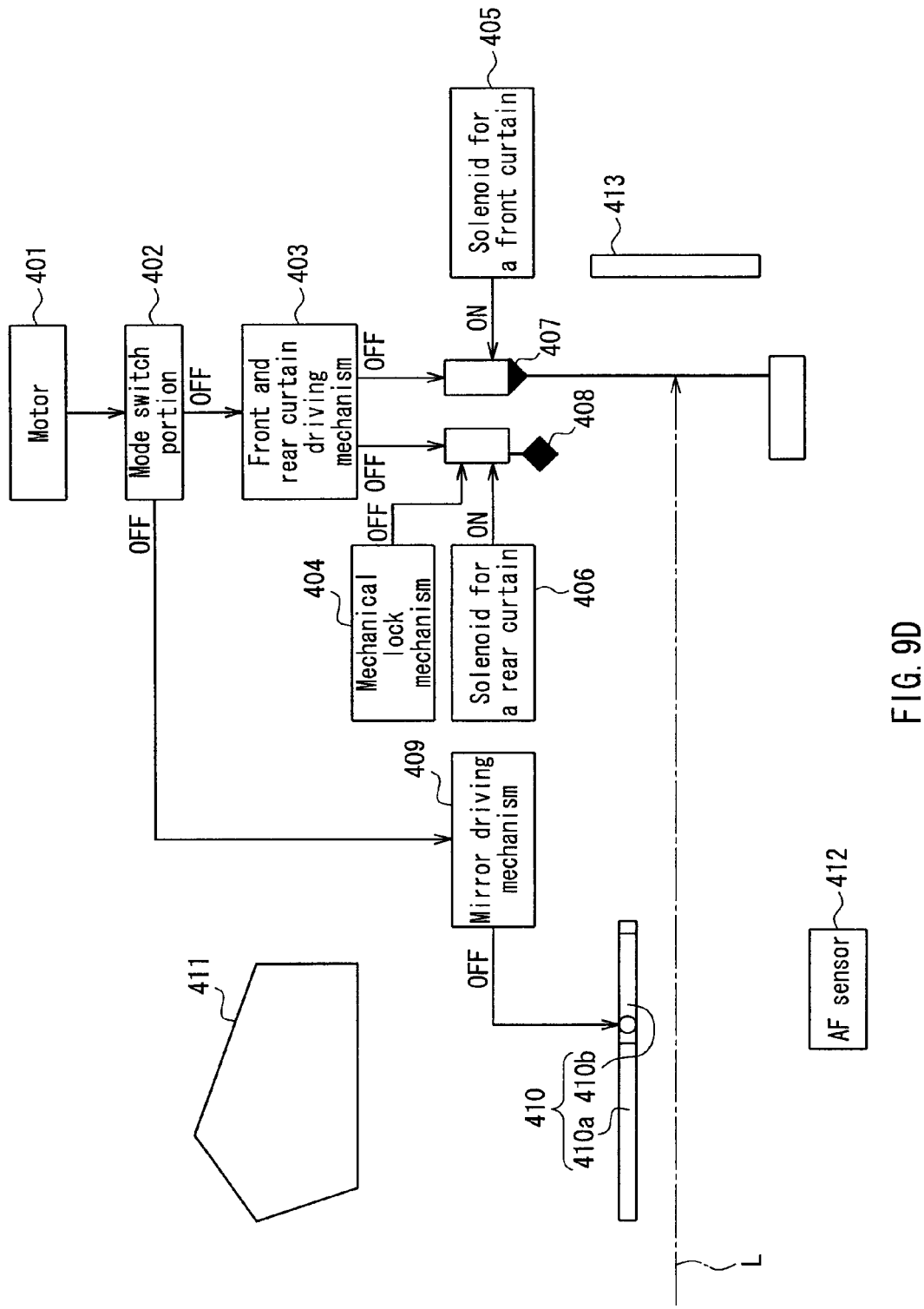
FIG. 9D is a schematic view showing an operation of the image pickup apparatus in Embodiment 1.
Figure 9E:
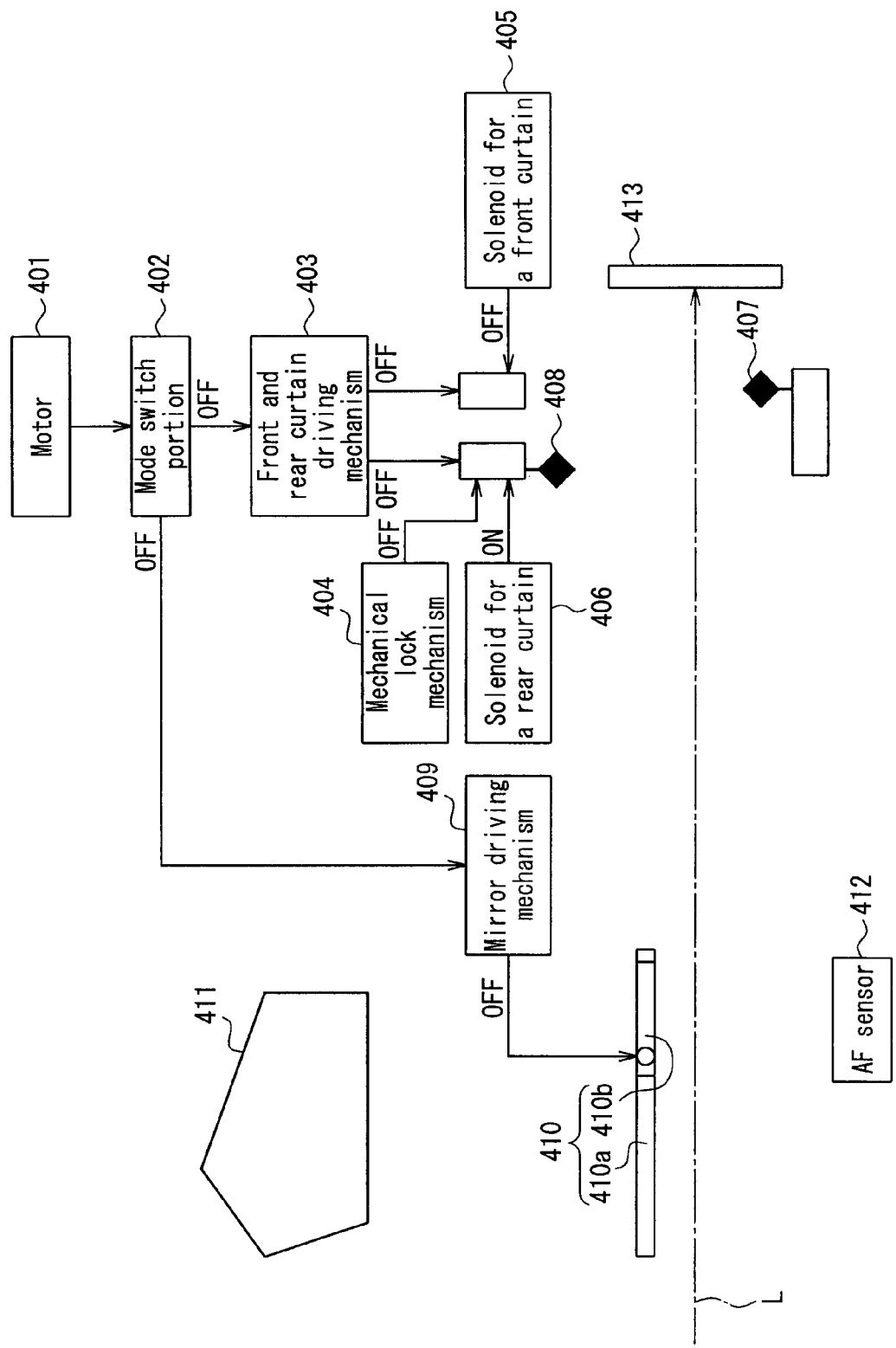
FIG. 9E is a schematic view showing an operation of the image pickup apparatus in Embodiment 1.
Figure 9F:
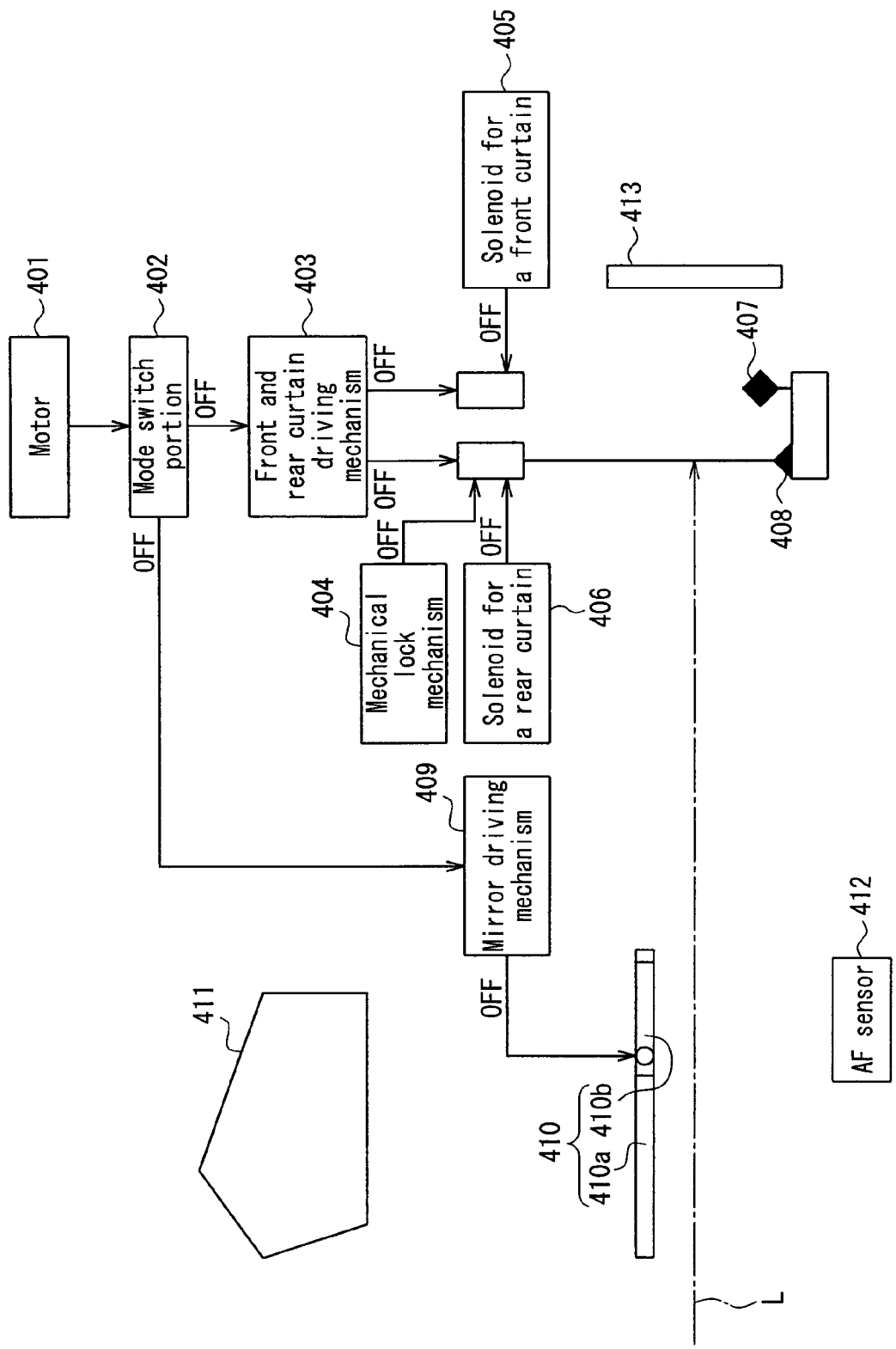
FIG. 9F is a schematic view showing an operation of the image pickup apparatus in Embodiment 1.
Figure 9G:
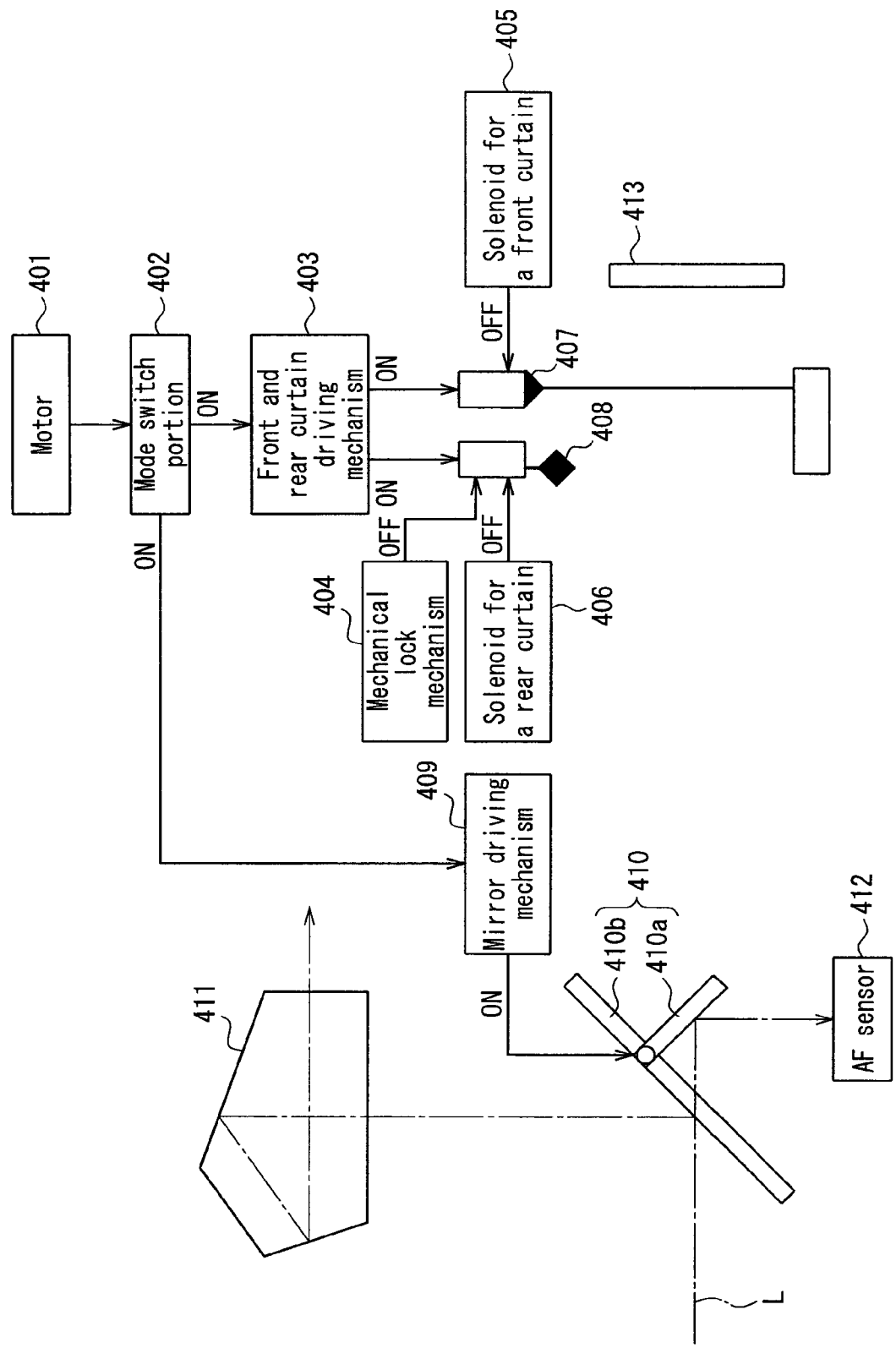
FIG. 9G is a schematic view showing an operation of the image pickup apparatus in Embodiment 1.
Figure 9H:
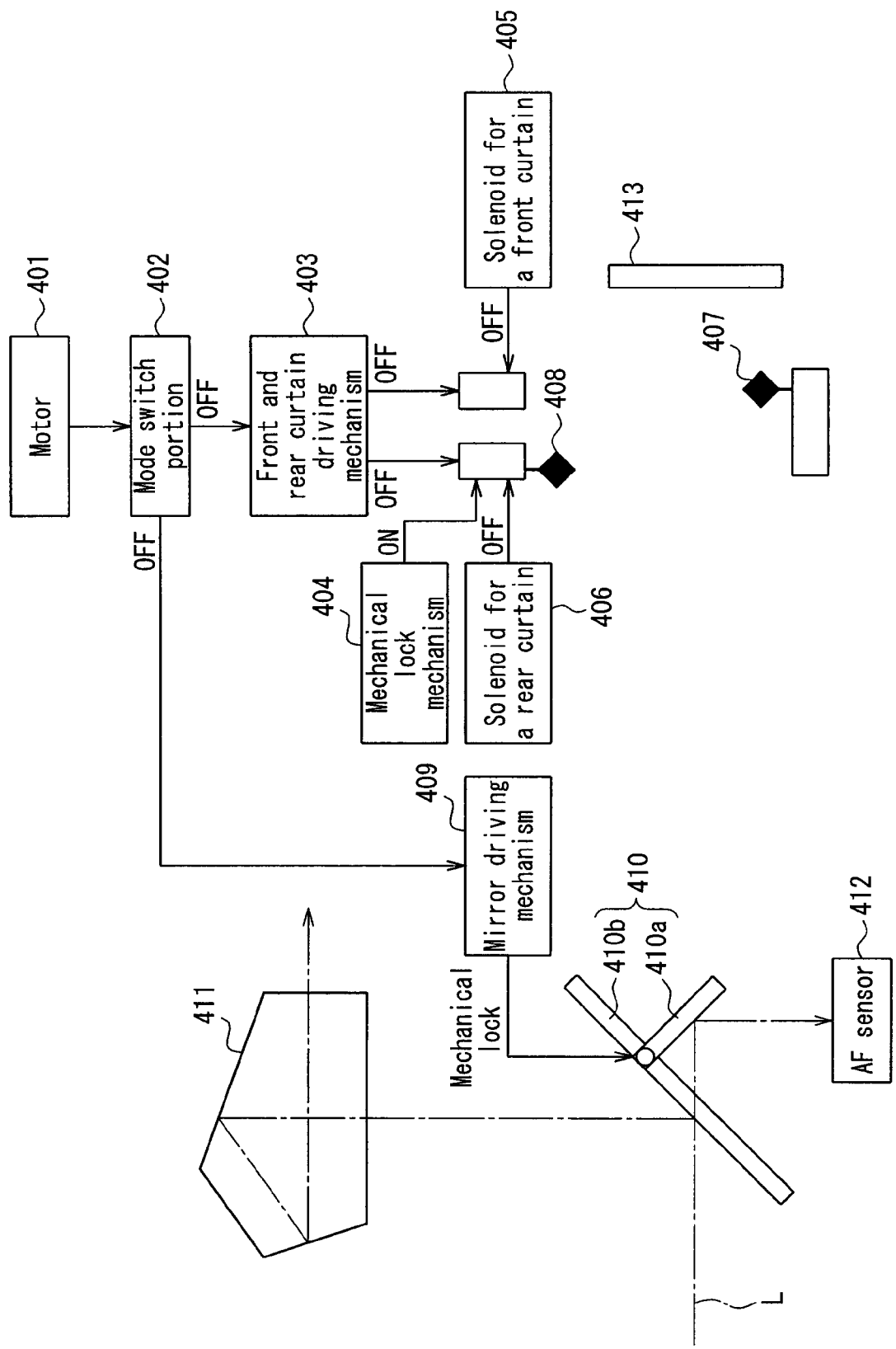
FIG. 9H is a schematic view showing an operation of the image pickup apparatus in Embodiment 1.

Furthermore, in the driving mechanism, the position (finder view state) shown in FIG. 9H is a first stop position, the position (live view state) shown in FIG. 9A is a second stop position, and the position shown in FIG. 9C is a third stop position. Furthermore, an operation period from the first stop position to the second stop position is a first operation period. An operation period from the second stop position to the third stop position is a second operation period. An operation period from the third stop position to the first stop position is a third operation period. Thus, a series of operations are completed during the first operation period, the second operation period, and the third operation period. Furthermore, an operation period from the first stop position to a third stop position is a fourth operation period. An operation period from the third stop position to the second stop position is a fifth operation period.

[4-1. Photographing Operation in a Finder View State]

Next, a photographing operation in a finder view state will be described with reference to FIGS. 7, 9A-9H, and 10A-10H. In the case of performing a photographing operation in a finder view state, the driving mechanism starts an operation from the state shown in FIG. 9H, and the state is shifted in the order of FIG. 9H, 9A, 9B, . . . , 9G, and finally returns to the state shown in FIG. 9H. Furthermore, the driving mechanism starts an operation from the state shown in FIG. 10A, and the state is shifted in the order of FIG. 10B, 10C, . . . , 10H, and finally returns to the state shown in FIG. 10A. More specifically, in the case of performing a photographing operation in a finder view state, the driving mechanism is shifted from the first stop position (e.g., see FIG. 9H) to the third stop position (e.g., see FIG. 9C) through the fourth operation period, and returns from the third stop position to the first stop position through the third operation period. In the third operation period, exposure is performed. Hereinafter, this process will be described sequentially.

Figure 10A:
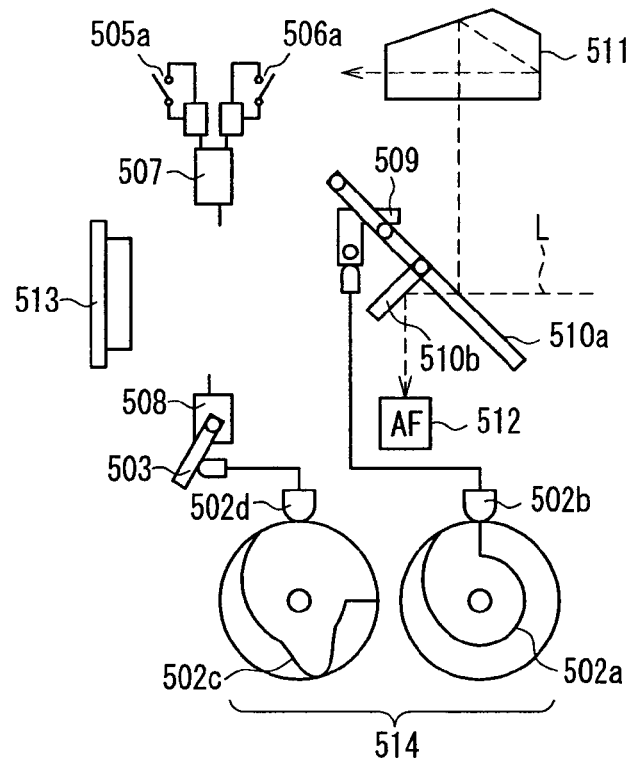
FIG. 10A is a schematic view showing an operation of the image pickup apparatus in a finder view mode in Embodiment 1.
Figure 10B:
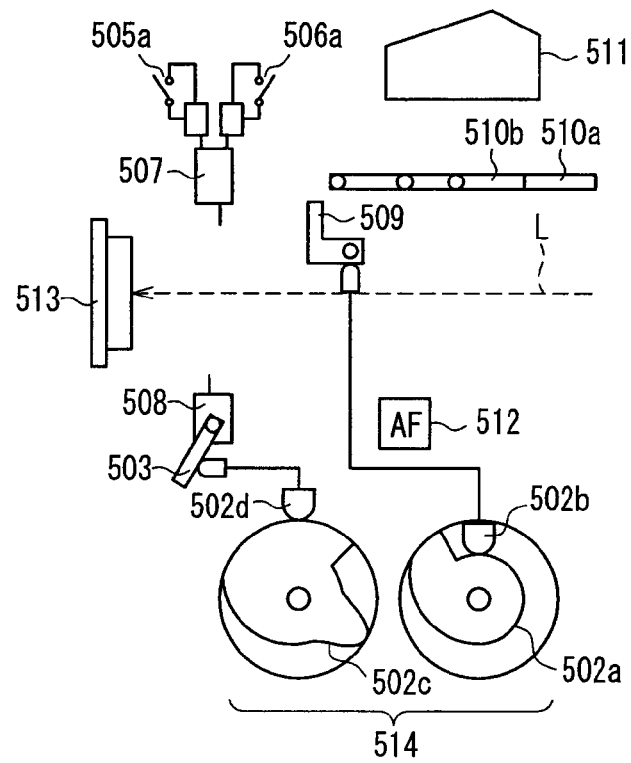
FIG. 10B is a schematic view showing an operation of the image pickup apparatus in a finder view mode in Embodiment 1.

First, as shown in FIG. 9H, when the photographing apparatus is in a finder view state, the mode switch portion 402 outputs an OFF signal to the mirror driving mechanism 409. Thus, the mirror driving mechanism 409 is mechanically locked while the movable mirror 410 is moved to the first position. When the movable mirror 410 is placed at the first position, the incident light L is reflected from the main mirror 410a to be guided to the finder portion 18 (see FIG. 3) through the Prism 411, and a part of the incident light L having passed through the main mirror 410a is reflected from the sub-mirror 410b to be incident upon the AF sensor 412. Furthermore, the mode switch portion 402 outputs an OFF signal to the first and second curtain driving mechanism 403, whereby the first and second curtain driving mechanism 403 retracts the first curtain 407 and the second curtain 408 from the incident optical path. The first curtain 407 and the second curtain 408 have their state locked mechanically by the mechanical lock mechanism 404. As the mechanical operation, as shown in FIG. 10A, the first cam follower 502b is pressed by the cam surface of the first cam 502a, whereby the mirror driving mechanism 509 places the movable mirror 510 at the first position. Furthermore, the second cam follower 502d is pressed by the cam surface of the second cam 502c, whereby the first and second curtain driving mechanism 503 is turned off (state in which the first and second curtain driving mechanism 503 is pressed in the left direction in the figure). As described above, a finder view state can be kept. The user can recognize visually an optical image by peering through the viewfinder 3 shown in FIG. 1 (Step S1 in FIG. 7).

Next, it is determined whether or not the release button 6 (see FIG. 1) has been pressed halfway. When the release button 6 is pressed halfway, the process proceeds to Step S3 (Step S2 in FIG. 7).

Next, an AF operation and an AE operation are performed. The AF operation and the AE operation are performed as shown in FIGS. 9H and 10A in the same way as in Step S1. According to the AF operation, a defocus amount is calculated in a signal processing microcomputer separately provided, based on an electrical image signal output from the AF sensor 412, and the calculated defocus amount is fed back to a focus motor for driving a focus lens, whereby the focus lens is moved to a desired position to adjust focusing. The focus lens and the focus motor are contained in the lens unit 2 shown in FIG. 1. Furthermore, according to the AE operation, the light amount of a subject is determined based on the electrical image signal output from a photometric sensor (not shown), a diaphragm control portion (not shown) is controlled so that the light amount becomes appropriate, and the opening of a diaphragm (not shown) is controlled. The diaphragm and control portion and the diaphragm are contained in the lens unit 2 shown in FIG. 1 (Step S3 in FIG. 7).

Next, it is determined whether or not the release button 6 has been pressed fully. The full depression corresponds to a photographing instruction. In the case where the release button 6 is pressed fully, the process proceeds to Step S5 (Step S4 in FIG. 7).

Next, a mechanical lock operation is performed. The mechanical lock operation is performed in the state shown in FIGS. 9A and 10B. Specifically, as shown in FIG. 9A, the mirror driving mechanism 409 retracts the movable mirror 410 to the second position based on the OFF signal output from the mode switch portion 402. Furthermore, the first and second curtain driving mechanism 403 stops an operation while the first curtain 407 and the second curtain 408 form the opening 110 (see FIG. 4), based on the OFF signal output from the mode switch portion 402. Furthermore, the solenoid for a first curtain 405 and the solenoid for a second curtain 406 are in an OFF state. Furthermore, the second curtain 408 has its operation locked mechanically by the mechanical lock mechanism 404. This allows the incident light L to be incident upon the image pickup element 413. Furthermore, regarding the mechanical operation, when the first cam 502a and the second cam 502c rotate in a counterclockwise direction from the state shown in FIG. 10A to be shifted to the state shown in FIG. 10B, the first cam follower 502b moves to an inner circumferential side along the cam surface of the first cam 502a. In synchronization therewith, the mirror driving mechanism 509 rotates to retract the movable mirror 510 to a second position. The position of the second cam follower 502d has not changed, so that the state of the first and second curtain driving mechanism 503 has not changed. This allows the incident light L to be incident upon the image pickup element 513 (Step S5 in FIG. 7).

Figure 10C:
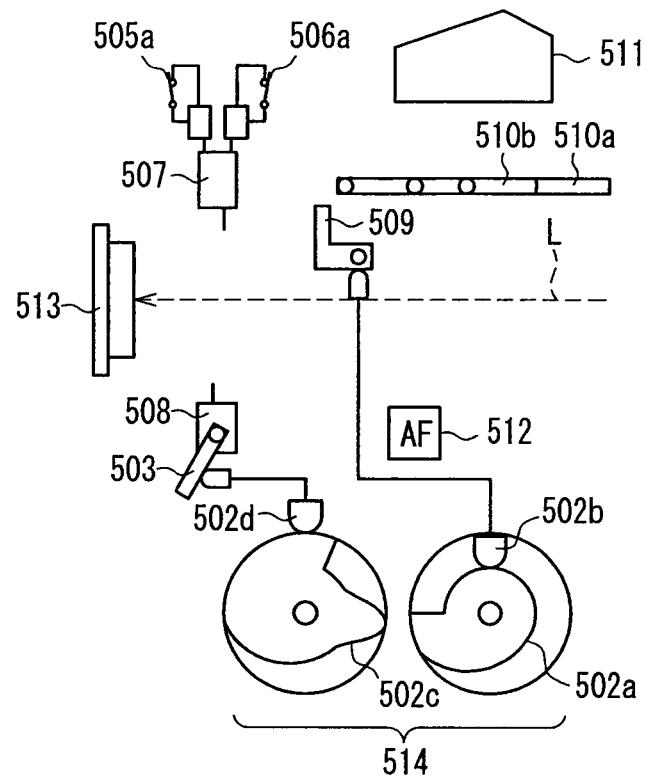
FIG. 10C is a schematic view showing an operation of the image pickup apparatus in a finder view mode in Embodiment 1.

Next, the solenoid for a first curtain 405 and the solenoid 406 for a second curtain 406 are turned on. The ON operations of both the solenoids are performed in the state shown in FIGS. 9B and 10C. Specifically, the solenoid for a first curtain 405 and the solenoid for a second curtain 406 in FIG. 9B are controlled so as to be turned on, whereby the first curtain 407 and the second curtain 408 can be held at predetermined positions. At this time, the second curtain 408 already has been placed at the second position by the mechanical lock mechanism 404, so that the position also is held with the solenoid for a second curtain 406. Since the first curtain 407 also is placed at the second position, the position and state thereof do not change even when the solenoid for a first curtain 405 is turned on. The remaining configuration does not change from the state shown in FIG. 9A. Furthermore, regarding the mechanical operation, as shown in FIG. 10C, the first switch 505a and the second switch 506a are turned on. The remaining configuration does not change from the state shown in FIG. 10B (Step S6 in FIG. 7).

Figure 10D:
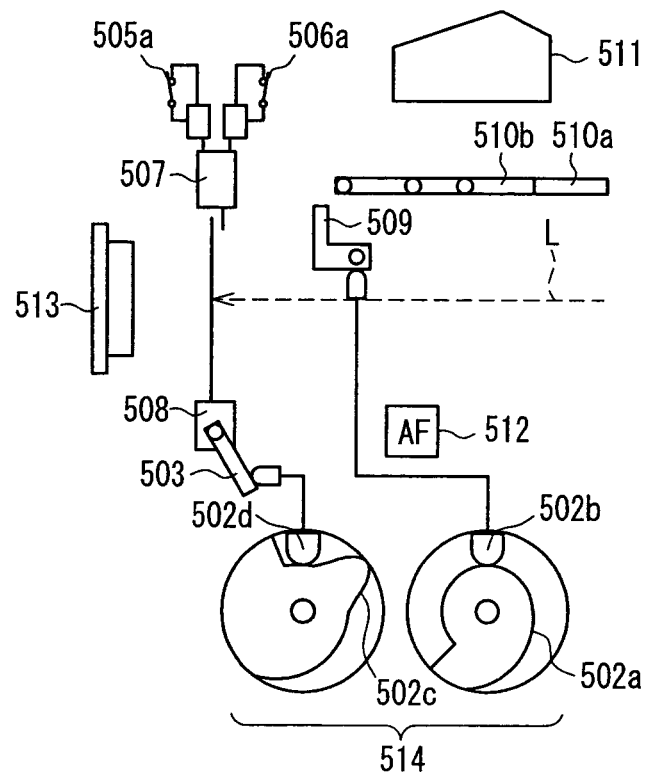
FIG. 10D is a schematic view showing an operation of the image pickup apparatus in a finder view mode in Embodiment 1.

Next, the first curtain 407 is moved (pulled up) to the first position. As a result of the pull-up operation of the first curtain 407, the state shown in FIGS. 9C and 10D is obtained. Specifically, as shown in FIG. 9C, the first and second curtain driving mechanism 403 controls the first curtain 407 and the second curtain 408 so as to pull them up based on an ON signal output from the mode switch portion 402. The first curtain 407 is pulled up from the second position (lowered position) to move to the first position. The second curtain 408 already has been at the second position i.e., lifted position), so that the position and state thereof do not change. The first curtain 407 that has been lifted is attracted by the solenoid for a first curtain 405 to be held at the first position since the solenoid for a first curtain 405 already has been turned on in Step S6. Furthermore, regarding the mechanical operation, as shown in FIG. 10D, the second cam follower 502d moves in an inner circumferential direction along the cam surface of the second cam 502c, so that the first and second curtain driving mechanism 503 is displaced (to a state in which the lever is rotated in the right direction in the figure). When the first and second curtain driving mechanism 503 is displaced as shown, the first curtain 507 moves from the second position to the first position. The first curtain 507 is held at the first position since the first switch 505a already has been turned on (Step S7 in FIG. 7).

Figure 10E:
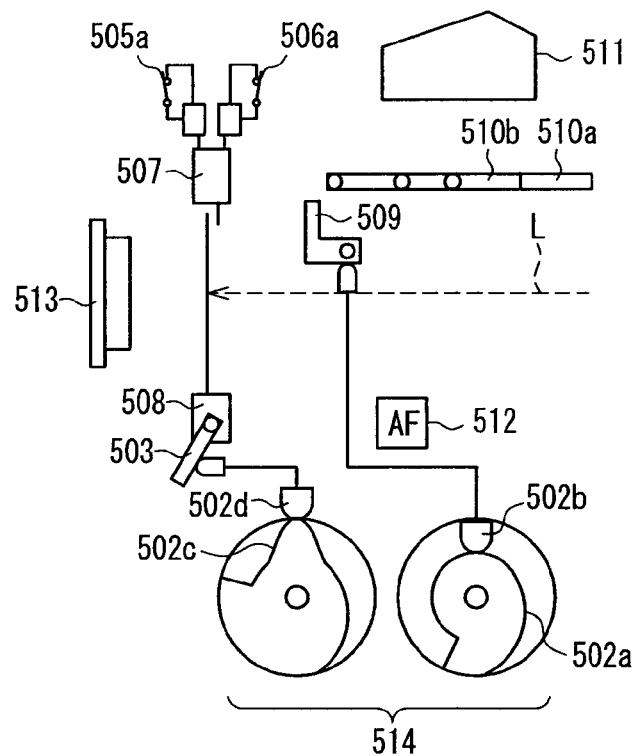
FIG. 10E is a schematic view showing an operation of the image pickup apparatus in a finder view mode in Embodiment 1.

Next, the mechanical lock of the second curtain 408 is cancelled. The mechanical lock is cancelled in the state shown in FIGS. 9D and 10E. Specifically, as shown in FIG. 9D, the ON signal output from the mechanical lock mechanism 404 is switched to an OFF signal, whereby the lock state of the second curtain 408 is cancelled. Along with this, the bias applied to the first curtain 407 and the second curtain 408 in the upward direction by the first and second curtain driving mechanism 403 is cancelled. Even if the lock state of the second curtain 408 is cancelled as described above, the second curtain 408 is held at the second position since the solenoid for a second curtain 406 is turned on. Furthermore, regarding the mechanical operation, as shown in FIG. 10E, since the second cam follower 502d moves in an outer circumferential direction along the cam surface of the second cam 502c, the first and second curtain driving mechanism 503 is displaced (the lever is rotated in the left direction in the figure), and the bias applied to the first curtain 507 and the second curtain 508 in the upward direction is cancelled. As described above, even when the lock state of the second curtain 508 is cancelled as described above, the second curtain 508 is held at the second position, since the solenoid for a second curtain 506 is turned on (Step S8 in FIG. 7).

Figure 10F:
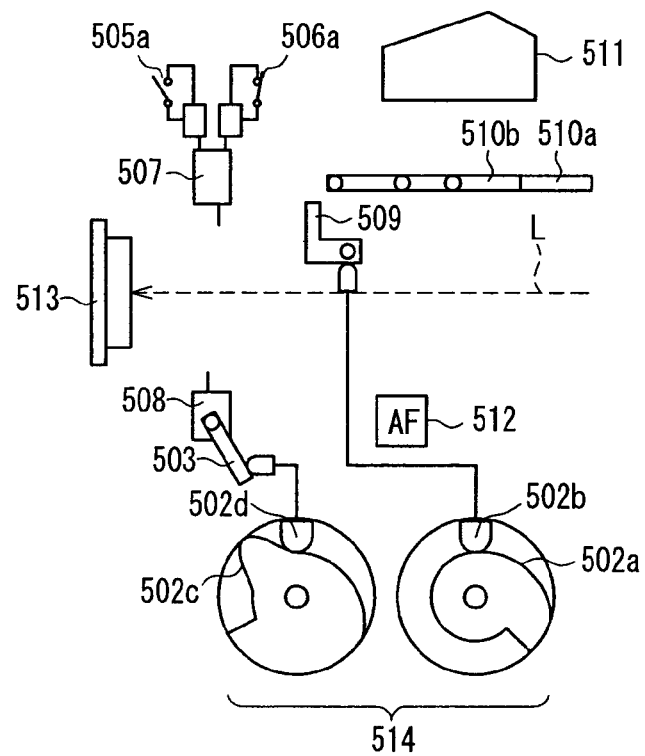
FIG. 10F is a schematic view showing an operation of the image pickup apparatus in a finder view mode in Embodiment 1.

Next, exposure is started. The exposure is performed in the state shown in FIGS. 9E and 10F. Specifically, as shown in FIG. 9E, the solenoid for a first curtain 405 is turned off. Then, the first curtain 407 held at the first position by the solenoid for a first curtain 405 is moved to the second position with the weight or the bias force of a spring (not shown) or the like. Consequently, the opening 110 (see FIG. 4) is formed, and the incident light L is incident upon a light-receiving surface of the image pickup element 413. Furthermore, regarding the mechanical operation, as shown in FIG. 10F, only the first switch 505a is turned off, whereby the lock state of the first curtain 507 is cancelled, and the first curtain 507 is moved to the second position. Since the second cam follower 502d moves again in an inner circumferential direction along the cam surface of the second cam 502c, the first and second curtain driving mechanism 503 is displaced (the lever is rotated in the right direction in the figure). However, the first curtain 507 has moved to the second position immediately before the displacement, so that the first curtain 507 does not move to the first position (Step S9 in FIG. 7).

Figure 10G:
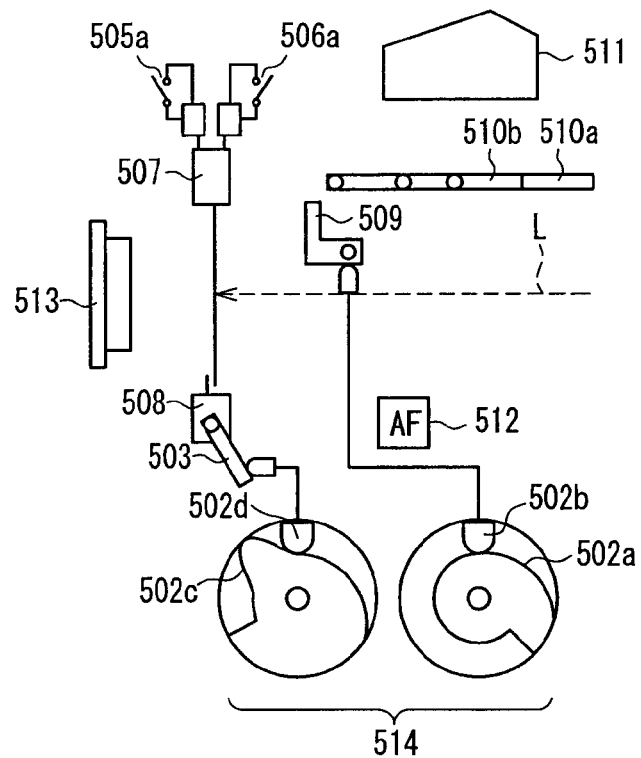
FIG. 10G is a schematic view showing an operation of the image pickup apparatus in a finder view mode in Embodiment 1.

Next, after the elapse of a predetermined time from the beginning of the exposure in Step S9, the first curtain 408 is moved to the second position to complete the exposure. The exposure is completed in the state shown in FIGS. 9F and 10G. Specifically, as shown in FIG. 9F, the solenoid for a second curtain 406 is turned off. Then, the second curtain 408 held at the second position by the solenoid for a second curtain 406 is moved to the first position with the weight or the bias force of a spring (not shown) or the like. Consequently, the incident light L incident upon the image pickup element 413 is blocked by the second curtain 408, and the exposure is completed. Furthermore, regarding the mechanical operation, as shown in FIG. 10G, the second switch 506a is turned off, whereby the lock state of the second curtain 508 is cancelled, and the second curtain 508 is moved to the first position (Step S10 in FIG. 7).

Figure 10H:
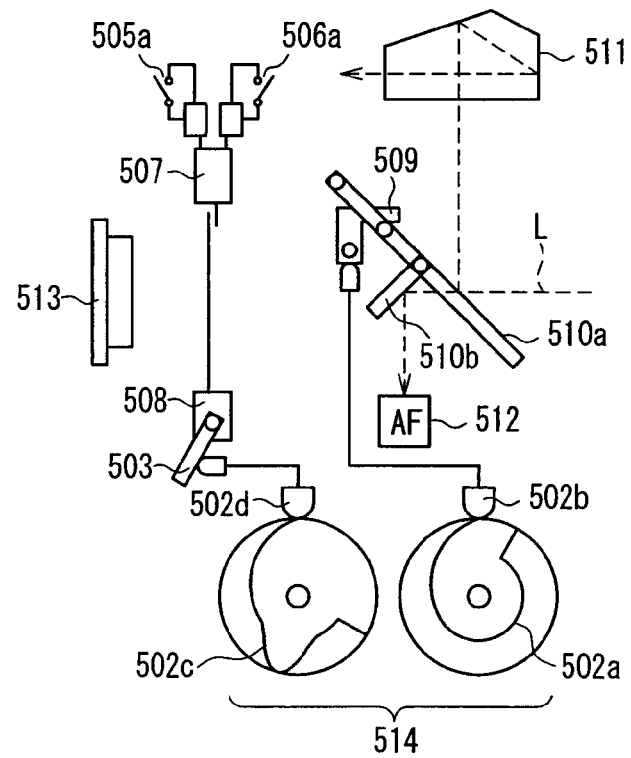
FIG. 10H is a schematic view showing an operation of the image pickup apparatus in a finder view mode in Embodiment 1.

Next, the first curtain 407 and the second curtain 408 are pulled up, and the movable mirror 410 is moved to the first position. The pull-up operation of the first curtain 407 and the second curtain 408 is performed in the state shown in FIGS. 9G and 10H. Specifically, as shown in FIG. 9G, the mode switch portion 402 outputs an ON signal to the first and second curtain driving mechanism 403. The first and second curtain driving mechanism 403 moves the first curtain 407 to the first position and moves the second curtain 408 to the second position, based on an ON signal to be input. At this time, the mechanical lock mechanism 404, the solenoid for a first curtain 405, and the solenoid for a second curtain 406 are turned off. On the other hand, the mode switch portion 402 outputs an ON signal also to the mirror driving mechanism 409. The mirror driving mechanism 409 moves the movable mirror 410 to the first position based on an ON signal to be input. Consequently, the incident light L is reflected from the main mirror 410a, and is guided to the Prism 411 side. Furthermore, a part of the incident light L passes through the main mirror 410a, is reflected from the sub-mirror 410b, and is guided to the AF sensor 412 side. Furthermore, regarding the mechanical operation, as shown in FIG. 10H, the first cam follower 502b moves in an outer circumferential direction along the cam surface of the first cam 502a, whereby the mirror driving mechanism 509 is rotated. When the mirror driving mechanism 509 is rotated, the movable mirror 410 moves from the second position to the first position. Furthermore, the second cam follower 502d moves in an outer circumferential direction along the cam surface of the second cam 502c, and the first and second curtain driving mechanism 503 is displaced (the lever is rotated in the left direction in the figure). When the first and second curtain driving mechanism 503 is displaced, the first curtain 507 is moved to the first position, and the second curtain 508 is moved to the second position (Step S11 in FIG. 7).

Finally, as shown in FIG. 9H, the mirror driving mechanism 409 locks the movable mirror 410 mechanically, and the mechanical lock mechanism 404 locks the second curtain 408 mechanically, whereby the finder view state shown in FIG. 9A can be obtained.

After that, every time the operation of a release button is received, the operations in Steps S1 to S11 in FIG. 7 are performed.

In the above description "output of an OFF signal" is assumed to include a state (non-signal state) in which a signal is not output.

Furthermore, Step S5 shown in FIG. 7 may be skipped (operation may be omitted). By skipping Step S5, the period from a time when the operation of a release button is received to a time when exposure is performed actually can be shortened, which can enhance a photographing response. Even if Step S5 is skipped, a photographing operation is performed normally.

[4-2. Photographing Operation in a Live View State]

Next, referring to FIGS. 8, 9, and 11, a photographing operation in a live view state will be described. According to the photographing operation in a live view state in FIG. 9, the operation starts from the state shown in FIG. 9A, and the state is shifted in the order of FIGS. 9B, 9C, . . . , 9H, and finally returns to the state shown in FIG. 9A. Furthermore, in FIG. 11, the operation starts from the state shown in FIG. 11A, and the state is shifted in the order of 11B, 11C, . . . , 11H and finally returns to the state shown in FIG. 11A. More specifically, the photographing operation in the live view state is shifted from the third stop position (e.g., see FIG. 9A) to the second stop position (e.g., see FIG. 9C) through the fifth operation period, and returns from the second stop position to the third stop position through the second operation period. The exposure is performed during the fifth operation period. Hereinafter, the process will be described sequentially.

Figure 11A:
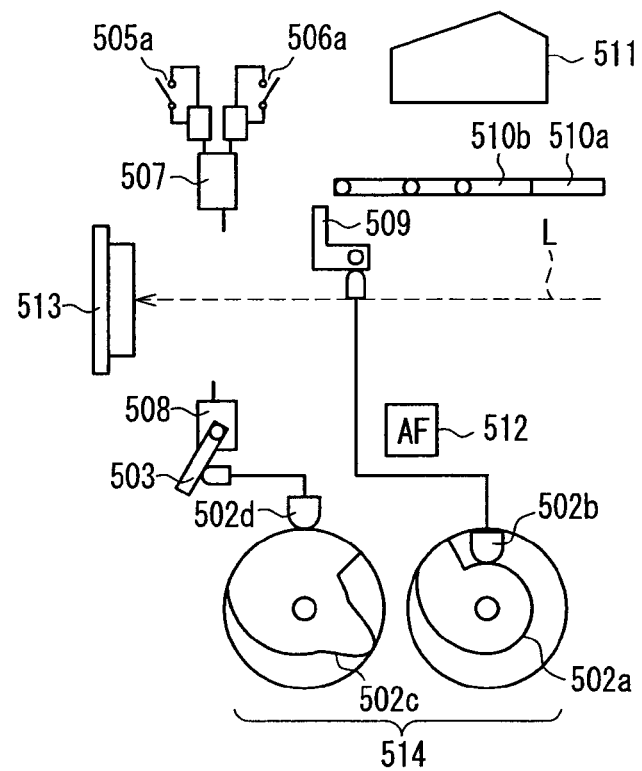
FIG. 11A is a schematic view showing an operation of the image pickup apparatus in a live view mode in Embodiment 1.

First, as shown in FIG. 9A, when the image pickup apparatus is in a live view state, the mode switch portion 402 outputs an OFF signal to the mirror driving mechanism 409. Thus, the mirror driving mechanism 409 is held while the movable mirror 410 is moved to the second position. Furthermore, the mode switch portion 402 outputs an OFF signal to the first and second curtain driving mechanism 403, whereby the first and second curtain driving mechanism 403 retracts the first curtain 407 and the second curtain 408 to the second position. The states of the first curtain 407 and the second curtain 408 are locked mechanically by the mechanical lock mechanism 404. Consequently, the incident light L is incident upon the image pickup element 413. The incident light L is converted into an electrical image signal by photoelectric conversion in the image pickup element 413 to be output. The electrical image signal is subjected to various kinds of signal processings in a signal processing microcomputer provided separately, and an image based on the electrical image signal is displayed on the monitor 4. Furthermore, as the mechanical operation, as shown in FIG. 11A, the first cam follower 502b is positioned on an inner circumferential side along the cam surface of the first cam 502a, whereby the mirror driving mechanism 509 retracts the movable mirror 510 to the second position. Furthermore, the second cam follower 502d is pressed by the cam surface of the second cam 502c, whereby the first and second curtain driving mechanism 503 is turned off (pressed in the left direction in the figure). As described above, the live view state can be kept, and the user can recognize visually an image on the monitor 4 shown in FIG. 1 (Step S21 in FIG. 8).

Next, it is determined whether or not the release button 6 (see FIG. 1) has been pressed halfway. When the release button 6 has been pressed halfway, the process proceeds to Step S23 (Step S22 in FIG. 8).

Next, an AF operation and an AE operation are performed. The AF operation and the AE operation are performed as shown in FIGS. 9A and 11A in the same way as in Step S21. According to the AF operation, a defocus amount is calculated in a signal processing microcomputer separately provided, based on an electrical image signal output from the image pickup element 413, and the calculated defocus amount is fed back to a motor for driving a focus lens, whereby the focus lens is moved to a desired position to adjust focusing. According to the AE operation, the light amount of a subject is determined based on an electrical image signal output from the image pickup element 413, and the diaphragm control portion on the lens unit 2 (see FIG. 1) side is controlled so that the light amount becomes appropriate, whereby the diaphragm opening is controlled (Step S23 in FIG. 8).

Next, it is determined whether or not the release button 6 has been pressed fully. The full depression corresponds to a photographing instruction. When the release button 6 is pressed fully, the process proceeds to Step S5 (Step S24 in FIG. 8).

Figure 11B:
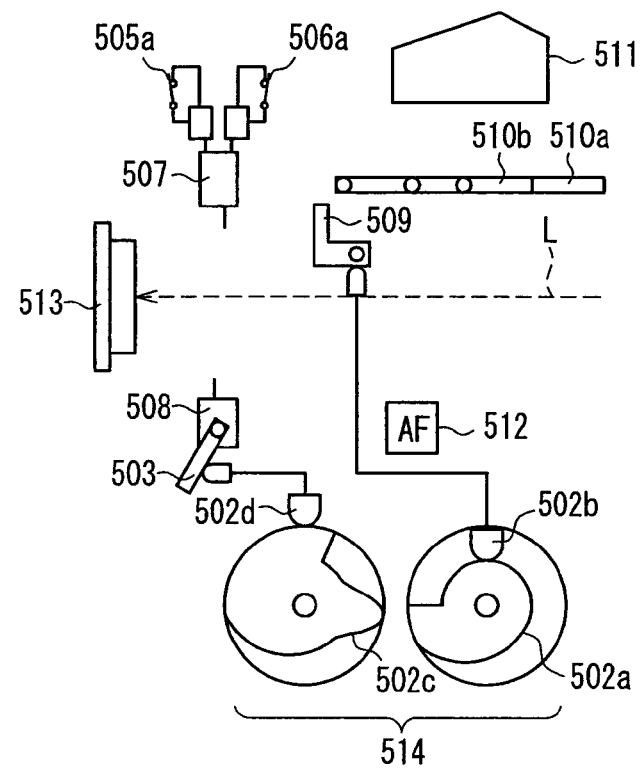
FIG. 11B is a schematic view showing an operation of the image pickup apparatus in a live view mode in Embodiment 1.

Next, the solenoid for a first curtain 405 and the solenoid for a second curtain 406 are turned on. The ON operations of both the solenoids are performed in the state shown in FIGS. 9B and 11B. Specifically, the solenoid for a first curtain 405 and the solenoid for a second curtain 406 in FIG. 9B are controlled so as to be turned on, whereby the first curtain 407 and the second curtain 408 can be held at predetermined positions. At this time, the second curtain 408 already has been placed at the second position by the mechanical lock mechanism 404, so that the position thereof also is kept with the solenoid for a second curtain 406. The first curtain 407 also is placed at the second position, so that the position and state thereof do not change even when the solenoid for a first curtain 405 is turned on. The remaining configuration does not change from the state shown in FIG. 9A. Furthermore, as the mechanical operation, as shown in FIG. 11B, the first switch 505a and the second switch 506a are turned on. The remaining configuration does not change from the state shown in FIG. 10A (Step S25 in FIG. 8).

Figure 11C:
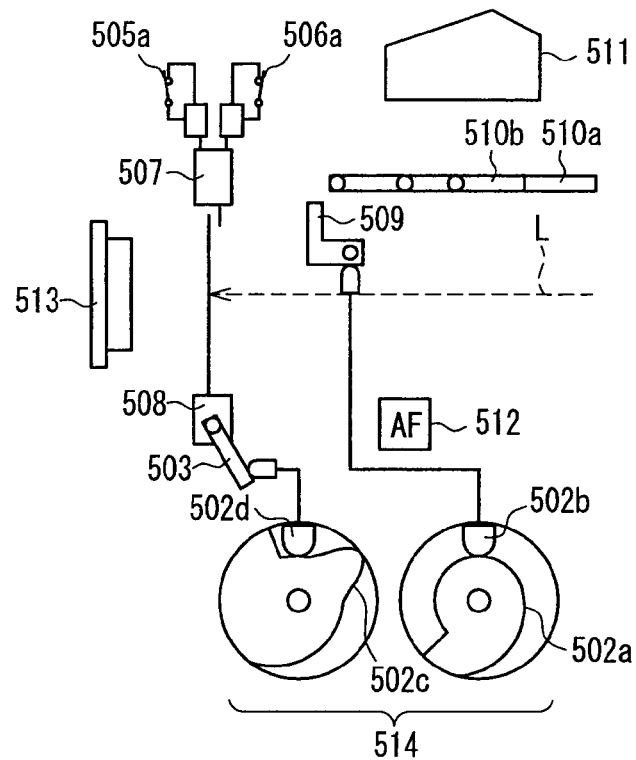
FIG. 11C is a schematic view showing an operation of the image pickup apparatus in a live view mode in Embodiment 1.

Next, the first curtain 407 is moved to the first position (pull-up operation). The pull-up operation of the first curtain is performed in the state shown in FIGS. 9C and 11C. Specifically, as shown in FIG. 9C, the first and second curtain driving mechanism 403 controls the first curtain 407 and the second curtain 408 so as to lift them, based on an ON signal output from the mode switch portion 402. The first curtain 407 is pulled up from the second position (lowered position) to move to the first position. The second curtain 408 already has been placed at the second position (lifted position), so that the position and state thereof do not change. The first curtain 407 that has been lifted is attached by the solenoid for a first curtain 405 to be held at the first position since the solenoid for a first curtain 405 already has been turned on in Step S6. Furthermore, regarding the mechanical operation, as shown in FIG. 11C, the second cam follower 502d moves in an inner circumferential direction along the cam surface of the second cam 502c, so that the first and second curtain driving mechanism 503 is displaced (state in which the lever is rotated in the right direction in the figure). When the first and second curtain driving mechanism 503 is displaced as shown, the first curtain 507 moves from the second position to the first position. The first curtain 507 is held at the first position since the first switch 505a already has been turned on (Step S26 in FIG. 8).

Figure 11D:
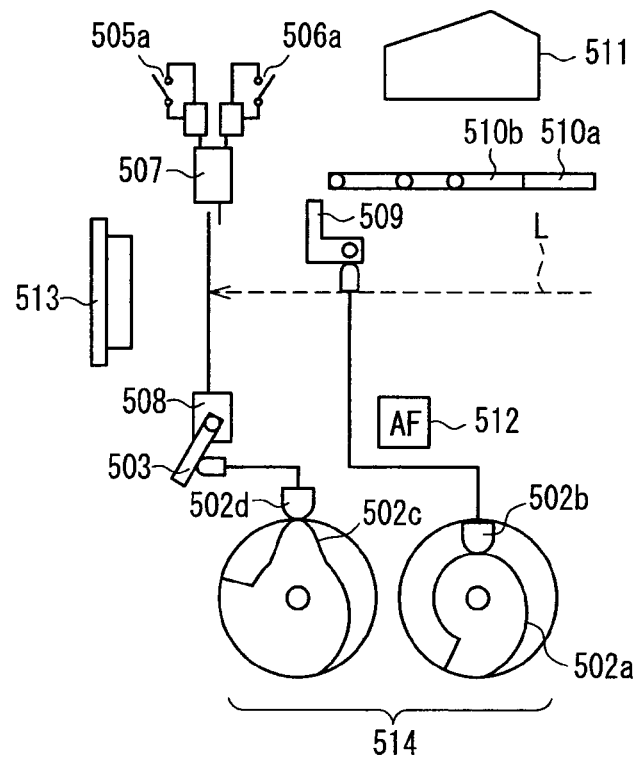
FIG. 11D is a schematic view showing an operation of the image pickup apparatus in a live view mode in Embodiment 1.

Next, the mechanical lock of the second curtain 408 is cancelled. The mechanical lock is cancelled in the state shown in FIGS. 9D and 11D. Specifically, as shown in FIG. 9D, the ON signal output from the mechanical lock mechanism 404 is switched to an OFF signal, whereby the lock state of the second curtain 408 is cancelled. Along with this, the bias applied in the upward direction with respect to the first curtain 407 and the second curtain 408 by the first and second curtain driving mechanism 403 is cancelled. Even if the lock state of the second curtain 408 is cancelled as described above, the second curtain 408 is held at the second position since the solenoid for a second curtain 406 is turned on. Furthermore, regarding the mechanical operation, as shown in FIG. 11D, since the second cam follower 502d moves in an outer circumferential direction along the cam surface of the second cam 502c, the first and second curtain driving mechanism 503 is displaced (the lever is rotated in the left direction in the figure), whereby the bias in the upward direction with respect to the first curtain 507 and the second curtain 508 is cancelled. Even if the lock state of the second curtain 508 is cancelled as described above, the second curtain 508 is held at the second position since the solenoid 506 for a second curtain is turned on (Step S27 in FIG. 8).

Figure 11E:
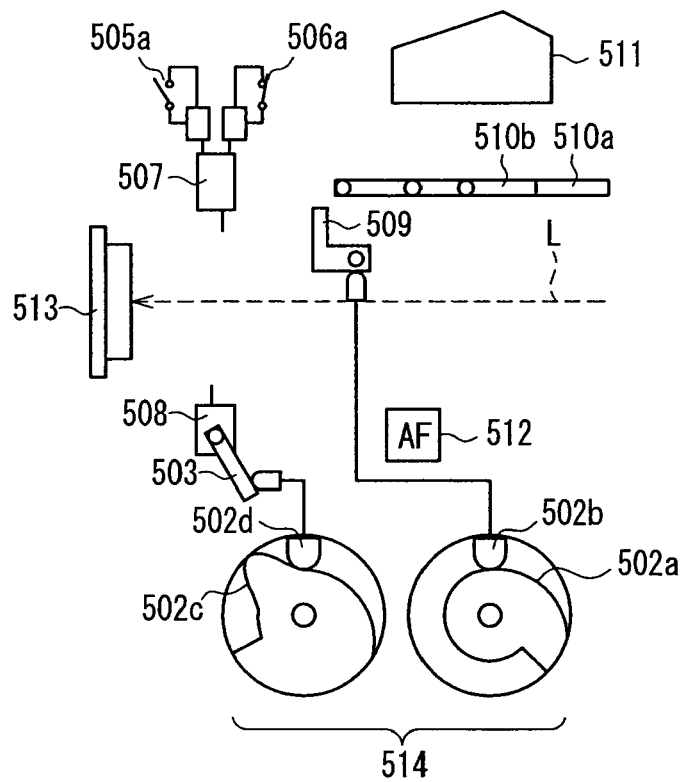
FIG. 11E is a schematic view showing an operation of the image pickup apparatus in a live view mode in Embodiment 1.

Next, exposure is started. The exposure is performed in the state shown in FIGS. 9E and 11E. Specifically, as shown in FIG. 9E, the solenoid for a first curtain 405 is turned off. Then, the first curtain 407 held at the first position by the solenoid for a first curtain 405 is moved to the second position with the weight or the bias force of a spring (not shown) or the like. This allows the opening 110 (see FIG. 4) to be formed, and the incident light L to be incident upon a light-receiving surface of the image pickup element 413. Furthermore, regarding the mechanical operation, as shown in FIG. 11E, only the first switch 505a is turned off, so that the lock state of the first curtain 507 is cancelled, and the first curtain 507 is moved to the second position. Since the second cam follower 502d moves in an inner circumferential direction again along the cam surface of the second cam 502c, the first and second curtain driving mechanism 503 is displaced (the lever rotates in the right direction in the figure). However, the first curtain 507 has moved to the second position immediately before the displacement, so that the first curtain 507 does not move to the first position (Step S28 in FIG. 8).

Figure 11F:
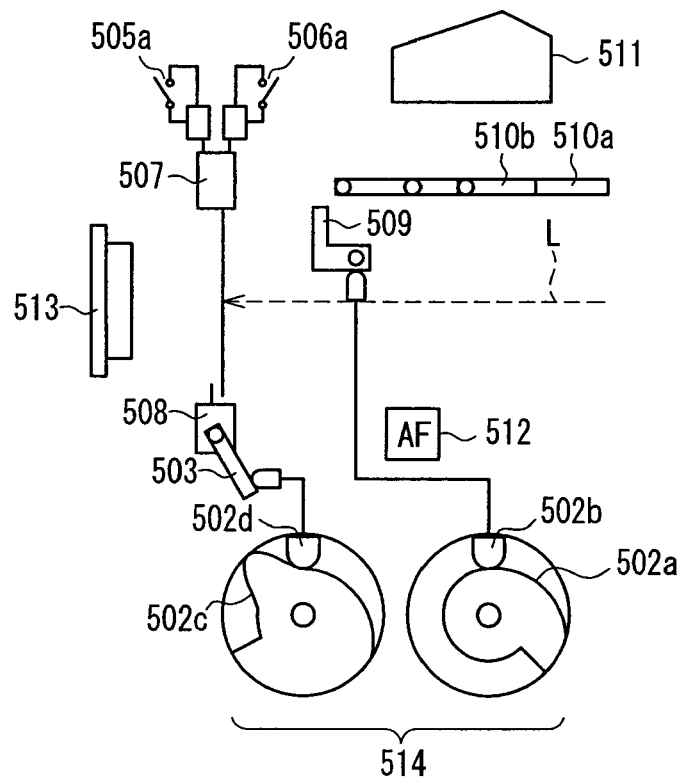
FIG. 11F is a schematic view showing an operation of the image pickup apparatus in a live view mode in Embodiment 1.

Next, after the elapse of a predetermined period of time from the commencement of exposure in Step S9, the second curtain 408 is moved to the second position to complete exposure. The exposure is completed in the state shown in FIGS. 9F and 11F. Specifically, as shown in FIG. 9F, the solenoid for a second curtain 406 is turned off. Then, the second curtain 408 held at the second position by the solenoid for a second curtain 406 is moved to the first position with the weight or the bias force of a spring (not shown) or the like. This allows the incident light L incident upon the image pickup element 413 to be blocked by the second curtain 408, whereby the exposure is completed. Furthermore, regarding the mechanical operation, as shown in FIG. 11F, the second switch 506a is turned off, whereby the lock state of the second curtain 508 is cancelled, and the second curtain 508 is moved to the first position (Step S29 in FIG. 8).

Figure 11G:
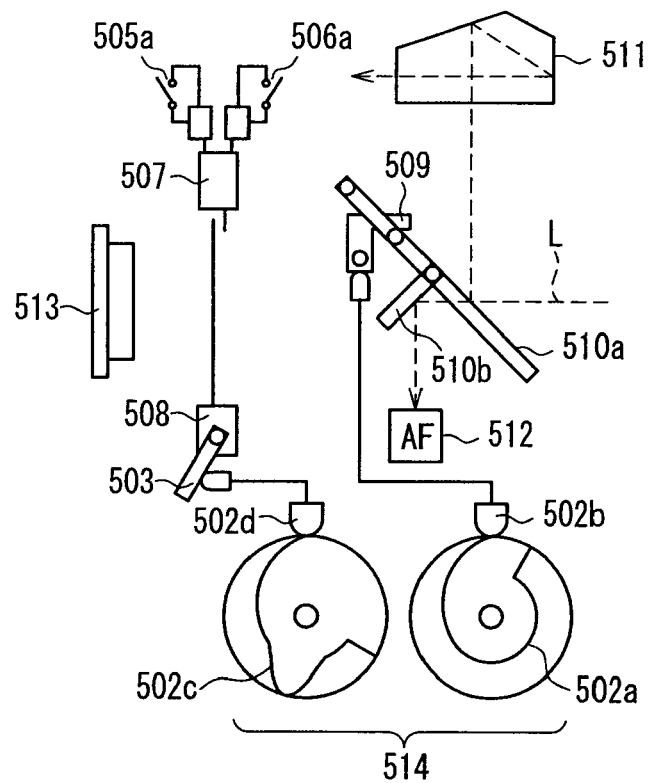
FIG. 11G is a schematic view showing an operation of the image pickup apparatus in a live view mode in Embodiment 1.

Next, the first curtain 407 and the second curtain 408 are pulled up, and the movable mirror 410 is moved to the first position. The pull-up operation of both the curtains is performed in the state shown in FIGS. 9G and 11G. Specifically, as shown in FIG. 9G, the mode switch portion 402 outputs an ON signal to the first and second curtain driving mechanism 403. The first and second curtain driving mechanism 403 moves the first curtain 407 to the first position and moves the second curtain 408 to the second position, based on an ON signal to be input. At this time, the mechanical lock mechanism 404, the solenoid for a first curtain 405, and the solenoid for a second curtain 406 are in an OFF state. On the other hand, the mode switch portion 402 outputs an ON signal also to the mirror driving mechanism 409. The mirror driving mechanism 409 moves the movable mirror 410 to the first position based on an ON signal to be input. Furthermore, regarding the mechanical operation, as shown in FIG. 11G, the first cam follower 502b moves in an outer circumferential direction along the cam surface of the first cam 502a, and the mirror driving mechanism 509 is rotated. When the mirror driving mechanism 509 rotates, the movable mirror 410 moves from the second position to the first position. Furthermore, the second cam follower 502d moves in an outer circumferential direction along the cam surface of the second cam 502c, and the first and second curtain driving mechanism 503 is displaced (the lever is rotated in the left direction in the figure). When the first and second curtain driving mechanism 503 is displaced, the first curtain 507 is moved to the first position, and the second curtain 508 is moved to the second position (Step S30 in FIG. 8).

Figure 11H:
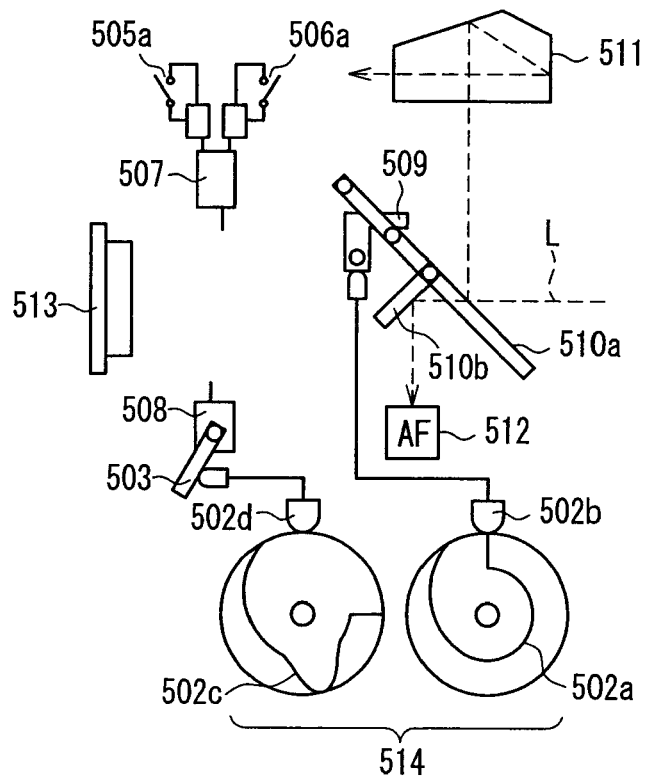
FIG. 11H is a schematic view showing an operation of the image pickup apparatus in a live view mode in Embodiment 1.

Next, the mechanical lock operation is performed. The mechanical lock operation is performed in the state shown in FIGS. 9H and 11H. Specifically, as shown in FIG. 9H, the mirror driving mechanism 409 locks the movable mirror 410 mechanically while the movable mirror 410 is retracted to the second position, based on an OFF signal output from the mode switch portion 402. Furthermore, the first and second curtain driving mechanism 403 stops the operations of the first curtain 407 and the second curtain 408 while they form the opening 110 (see FIG. 4), based on an OFF signal output from the mode switch portion 402. The solenoid for a first curtain 405 and the solenoid for a second curtain 406 are in an OFF state. Furthermore, the operation of the second curtain 408 is locked mechanically by the mechanical lock mechanism 404. Furthermore, regarding the mechanical operation, as shown in FIG. 11H, the position of the first cam follower 502b in the first cam 502a and the position of the second cam follower 502d with respect to the second cam 502c do not change from those shown in FIG. 11, respectively, so that the state of the first and second curtain driving mechanism 503 does not change, either (Step S31 in FIG. 8).

Finally, as shown in FIG. 9A, the mirror driving mechanism 409 cancels the mechanical lock state of the movable mirror 410, and retracts the movable mirror 402 to the second position based on the OFF signal output from the mode switch portion 402. This enables the state to be shifted to the live view state shown in FIG. 9B.

Thereafter, every time the operation of the release button is received, the operations in Steps S21 to S31 in FIG. 8 are performed.

In the above description, it is assumed that the "output of an OFF signal" includes a state (non-signal state) in which a signal is not output.

Furthermore, Step S31 in FIG. 8 may be skipped. By skipping Step S31, the period from a time when the operation of the release button is received to a time when exposure is performed actually can be shortened, which can enhance a photographing response. Even if Step S31 is skipped, the photographing operation is performed normally.

[5. Effects of Embodiments, etc.]

In the present embodiment, due to the presence of the mechanical lock mechanism 404 capable of holding the second curtain 408 in an open state, it is not necessary to energize the solenoid for a second curtain 406 continuously so as to keep the second curtain 408 in an open state. Thus, although both the curtains need to be held in an open state in a live view mode, it is not necessary to energize the solenoid for a first curtain and the solenoid for a second curtain continuously. This can reduce the power consumption in the live view mode. Furthermore, the heat generation in the solenoids can be reduced.

Furthermore, in the finder view mode, the mechanical lock mechanism 404 holds the second curtain 408 in an open state, and keeps the first curtain 407 in an open state, whereby the switch from the finder view mode to the live view mode can be performed quickly. Furthermore, the operation control of the first curtain 407 and the second curtain 408 for switching the finder view mode to the live view mode can be performed easily. Furthermore, the generation of an operation sound at a time of mode switch can be reduced. More specifically, when the first curtain 407 and the second curtain 408 are kept closed in the finder view mode, it is necessary to perform the operation of shifting the first curtain 407 and the second curtain 408 to the open state and the operation of swinging the movable mirror 410 to the second position. In the present embodiment, since the first curtain 407 and the second curtain 408 already have been shifted to the open state, so that the movable mirror 410 only may be swung to the second position during the shift to the live view mode. Thus, the shift speed during the shift from the finder view mode to the live view mode can be increased, the operation control can be performed easily, and the generation of an operation sound can be reduced.

Furthermore, the cam for driving a mirror (the first cam 502a, the first cam follower 502b) and the cam for driving a shutter (the second cam 502c, the second cam follower 502d) are provided, and when the apparatus receives a photographing instruction, the cam for driving a mirror and the cam for driving a shutter are rotated in one direction by the rotation in one direction by the motor, whereby the movable mirror 410 and the shutter are driven. Therefore, the period from a time when the operation of the release button is received to a time when exposure is performed actually can be shortened, which can enhance a photographing response. In particular, since the time between photographing frames can be shortened in continuous photographing, the number of photographing frames per unit time can be increased, and high-speed continuous photographing can be performed. Furthermore, the movable mirror 410 and the shutter are driven by the rotation in one direction by the motor, so that the operation control can be performed easily compared with that for forward rotating or reversely rotating the motor selectively.

Furthermore, in the present configuration, due to the configuration of the cam for driving a mirror, the movable mirror 410 enters the optical path during a series of photographing operations at least once. The movable mirror 410 enters the optical path only in the state J (Step S11 in FIG. 7 in the finder view mode and Step S30 in FIG. 8 in the live view mode), so that the exposure is not influenced. More specifically, when the release button is operated, if the movable mirror 410 is swung before the exposure, it takes a long time to perform the exposure, and a photographing response decreases. However, by setting the timing at which the movable mirror 410 enters the optical path after the completion of exposure as in the present embodiment, the period from a time when the release button is operated to a time when the exposure is performed can be shortened.

Furthermore, in the live view mode, the state H (first stop position) shown in Step S31 in FIG. 8 is skipped. Therefore, the period from a time when the operation of the release button is received to a time when exposure is performed actually can be shortened, whereby a photographing response can be enhanced. In particular, in continuous photographing, the time between the respective photographing frames can be shortened, so that the number of photographing frames per unit time can be increased, which enables high-speed continuous photographing.

Furthermore, in the finder view mode, the state A (second stop position) shown in Step S5 in FIG. 7 is skipped. Therefore, the period from a time when the operation of the release button is received to a time when exposure is performed actually can be shortened, whereby a photographing response can be enhanced. In particular, the time between the respective photographing frames can be shortened in continuous photographing, so that the number of photographing frames per unit time can be increased, which enables high-speed continuous photographing.

Furthermore, during a series of operation periods, by controlling the movable mirror 410 so that it enters the optical path once, the swinging repetitions of the movable mirror 410 can be minimized, so that the mirror driving control can be simplified. Furthermore, the generation of an operation sound involved in the mirror swinging can be reduced.

Furthermore, the component count can be reduced by forming the cam for driving a mirror and the cam for driving a shutter integrally. According to the configuration in which the cam for driving a mirror and the cam for driving a shutter are formed separately, and thereafter, they are combined, it is difficult to keep the relatively high positional precision of both the cams. However, by forming them integrally as in the present embodiment, the relatively high positional precision of both the cams can be maintained.

The image pickup apparatus 1 in Embodiment 1 may be a digital single-lens reflex camera in which the lens unit 2 can be attached/detached or a digital single-lens reflex camera integrated with a lens.

The image pickup apparatus according to the present invention also is applicable to a single-lens reflex camera capable of performing live view photographing with a low power consumption.

[Note 1]

An image pickup apparatus of the present invention includes a shutter having a first curtain and a second curtain; a shutter driver that drives the shutter so as to shift the first curtain from an open state to a closed state and to shift the second curtain from a closed state to an open state; a solenoid for a first curtain that holds the first curtain in the closed state with an electromagnetic force; a solenoid for a second curtain that holds the second curtain in the open state with an electromagnetic force; a holder capable of holding the second curtain and/or the first curtain in the open state mechanically; an image pickup that captures a subject image passing through the shutter to generate image data while the shutter is in the open state; a display that displays an image based on image data obtained by subjecting the image data generated by the image pickup to predetermined processing; and a controller that controls the holder so as to hold the second curtain in the open state and controls the display so as to display the image data generated based on the subject image incident upon the image pickup as a moving image while the first curtain is in the open state.

According to the above configuration, the power consumption can be reduced. Furthermore, the period from a time when the operation of a release button is received to a time when exposure is performed actually can be shortened, whereby a photographing response can be enhanced.

The first and second curtain driving mechanism 403 is an example of the shutter driver. The mechanical lock mechanism 404 is an example of the holder. The image pickup element 413 is an example of the image pickup. The monitor 4 is an example of the display. A microcomputer contained in the body unit 1 is an example of the controller.

[Note 2]

The image pickup apparatus of the present invention further includes: a movable mirror that is placed so as to enter or retract with respect to an optical path in an image pickup optical system so as to guide the subject image to an optical viewfinder; a mirror driver that swings the movable mirror so that the movable mirror enters or retracts with respect to the optical path; a motor to be a driving source of the mirror driver and the shutter driver; and a driving mechanism that drives the mirror driver and the shutter driver in synchronization with rotation of the motor, wherein the driving mechanism is capable of selectively being shifted to a finder view mode of driving the mirror driver so that the movable mirror is placed in the optical path and a live view mode of driving the mirror driver so that the movable mirror is retracted from the optical path, and the shutter holder holds the second curtain in the open state and holds the first curtain in the open state in the finder view move.

According to the above configuration, in the finder view mode, the first curtain is held in the open state while the second curtain is held in the open state, so that the finder view mode can be switched to the live view mode quickly. Furthermore, the operation of the first curtain and the second curtain can be controlled easily in switching from the finder view mode to the live view mode.

The mirror driving mechanism 409 is an example of the mirror driver. The mode switch portion 402 is an example of the driving mechanism.

[Note 3]

In the image pickup apparatus of the present invention, the driving mechanism includes: a cam for driving a mirror that drives the mirror driver; and a cam for driving a shutter that drives the shutter driver, wherein when the apparatus receives a photographing instruction, the cam for driving a mirror and the cam for driving a shutter rotate in one direction due to rotation in one direction caused by the motor, the cam for driving a mirror controls the mirror driver so as to swing the movable mirror, and the cam for driving a shutter controls the shutter driver so as to open or close the shutter.

According to the above configuration, the movable mirror and the shutter are driven by the rotation in one direction caused by the motor. Therefore, the period from a time when the operation of the release button is received to a time when exposure is performed actually can be shortened, whereby a photographing response can be enhanced. Furthermore, the movable mirror and the shutter are driven by the rotation in one direction caused by the motor, so that the operation control can be performed easily compared with that of forwardly rotating the motor or reversely rotating the motor selectively.

[Note 4]

In the image pickup apparatus of the present invention, the driving mechanism includes, in a rotation range of the cam for driving a mirror and the cam for driving a shutter, a first stop position where the movable mirror is placed in the optical path and the first curtain and the second curtain are held in the open state, a second stop position where the movable mirror is retracted from the optical path and the first curtain and the second curtain are held in the open state, and a third stop position where the movable mirror is retracted from the optical path and the first curtain and the second curtain are held in the closed state, wherein during a first operation period in which the first stop position is shifted to the second stop position, the movable mirror is retracted from the optical path, and the first curtain and the second curtain are held in the open state, during a second operation period in which the second stop position is shifted to the third stop position, the movable mirror is kept retracted from the optical path, and the first curtain and the second curtain are shifted to the closed state, and during a third operation period in which the third stop position is shifted to the first stop position, exposure in the image pickup is performed, and after completion of the exposure, the movable mirror is allowed to enter the optical path and the first curtain and the second curtain are shifted to the open state.

According to the above configuration, the movable mirror and the shutter are driven by the rotation in one direction caused by the motor, so that the period from a time when the operation of the release button is received to a time when exposure is performed actually can be shortened, whereby a photographing response can be enhanced. Furthermore, since the movable mirror and the shutter are driven by the rotation in one direction caused by the motor, so that the operation control can be performed easily compared with that of forwardly rotating the motor and reversely rotating the motor selectively. Furthermore, according to the above configuration, due to the configuration of the cam for driving a mirror, the movable mirror enters the optical path during a series of photographing operations. However, the movable mirror enters the optical path only between the completion of the exposure and the first stop position, which does not influence the exposure.

[Note 5]

In the image pickup apparatus of the present invention, the driving mechanism includes, in a rotation range of the cam for driving a mirror and the cam for driving a shutter, a first stop position where the movable mirror is placed in an optical path and the first curtain and the second curtain are held in the open state, a second stop position where the movable mirror is retracted from the optical path and the first curtain and the second curtain are held in the open state, a third stop position where the movable mirror is retracted from the optical path and the first curtain and the second curtain are held in the closed state, wherein during a fourth operation period in which the first stop position is shifted to the third stop position through the second stop position, the movable mirror is retracted outside of the optical path, the first curtain and the second curtain are held in the open state, the movable mirror is kept retracted outside of the optical path, and the first curtain and the second curtain are shifted to the dosed state, during a third operation period in which the third stop position is returned to the first stop position, exposure in the image pickup is performed, after the completion of the exposure, the movable mirror is allowed to enter the optical path, and the first curtain and the second curtain can be shifted to the open state, and during the fourth operation period, the first stop position is shifted to the third stop position without stopping at the second stop position According to the above configuration, the second stop position is skipped during a series of photographing operations. Therefore, the period from a time when the operation of the release button is received to a time when exposure is performed actually can be shortened, whereby a photographing response can be enhanced. In particular, in the finder view mode, a photographing response can be enhanced.

[Note 6]

In the image pickup apparatus of the present invention, the driving mechanism includes, in a rotation range of the cam for driving a mirror and the cam for driving a shutter, a first stop position where the movable mirror is placed in an optical path and the first curtain and the second curtain are held in the open state, a second stop position where the movable mirror is retracted from the optical path and the first curtain and the second curtain are held in the open state, a third stop position where the movable mirror is retracted from the optical path and the first curtain and the second curtain are held in the closed state, wherein during a second operation period in which the second stop position is shifted to the third stop position, the movable mirror is kept retracted outside of the optical path, and the first curtain and the second curtain are shifted to the closed state, during a fifth operation period in which the third stop position is returned to the second stop position through the first stop position, exposure in the image pickup is performed, after the completion of the exposure, the movable mirror is allowed to enter the optical path, the first curtain and the second curtain are shifted to the open state, the movable mirror is retracted outside of the optical path, and the first curtain and the second curtain are held in the open state, and during the fifth period, the third stop position is shifted to the second stop position without stopping at the first stop position.

According to the above configuration, the first stop position can be skipped during a series of photographing operations. Therefore, the period from a time when the operation of the release button is received to a time when exposure is performed actually can be shortened, whereby a photographing response can be enhanced. In particular, in the live view mode, a photographing response can be enhanced.

[Note 7]

In the image pickup apparatus of the present invention, the driving mechanism includes, in a rotation range of the cam for driving a mirror and the cam for driving a shutter, a first stop position where the movable mirror is placed in the optical path and the first curtain and the second curtain are held in the open state, a second stop position where the movable mirror is retracted from the optical path and the first curtain and the second curtain are held in the open state, and a third stop position where the movable mirror is retracted from the optical path and the first curtain and the second curtain are held in the closed state, when the apparatus receives a photographing instruction, during a fourth operation period in which the first stop position is shifted to the third stop position through the second stop position, the mirror controller is controlled to retract the movable mirror from the optical path, and the shutter driver is controlled to shift the first curtain and the second curtain to the closed state, during a third operation period in which the third stop position is shifted to the first stop position, exposure in the image pickup is performed, and after completion of the exposure, the mirror controller is controlled to allow the movable mirror to enter the optical path, and the shutter driver is controlled to shift the first curtain and the second curtain to the open state.

According to the above configuration, the second stop position is not provided. Therefore, the period from a time when the operation of the release button is received to a time when actual exposure is performed can be shortened, whereby a photographing response can be enhanced. According to this configuration, in the finder view mode, the photographing response can be enhanced.

[Note 8]

In the image pickup apparatus of the present invention, the driving mechanism includes a second operation period in which the second stop position is shifted to the third stop position, and a fifth operation period in which the third stop position is shifted to the second stop position without stopping at the first stop position, wherein when the apparatus receives a photographing instruction during a finder view mode, the first stop position is shifted to the third stop position through the fourth operation period, and the third stop position is shifted to the first stop position through the third operation period, and when the apparatus receives a photographing instruction during a live view mode, the second stop position is shifted to the third stop position through the second operation period, and the third stop position is shifted to the second stop position through the fifth operation period.

According to the above configuration, the period from a time when the operation of the release button is received to a time when exposure is performed actually can be shortened, whereby a photographing response can be enhanced.

[Note 9]

In the image pickup apparatus of the present invention, the driving mechanism controls the mirror controller so as to allow the movable mirror to enter the optical path once during a series of operation periods including all or a part of the first, second, and third operation periods.

According to the above configuration, the swinging repetitions of the movable mirror can be minimized, so that the mirror driving control can be performed easily. Furthermore, the generation of an operation sound involved in the mirror swinging can be reduced.

[Note 10]

In the image pickup apparatus of the present invention, the driving mechanism controls the mirror controller so as to allow the movable mirror to enter the optical path once during a series of operation periods including all or a part of the third and fourth operation periods.

According to the above configuration, the swinging repetitions of the movable mirror can be minimized, so that the mirror driving control can be simplified. Furthermore, the generation of an operation sound involved in the mirror swinging can be reduced.

[Note 11]

In the image pickup apparatus of the present invention, the driving mechanism controls the mirror controller so as to allow the movable mirror to enter the optical path once during a series of operation periods including all or a part of the second and fifth operation periods.

According to the above configuration, the swinging repetitions of the movable mirror can be minimized, so that the mirror driving control can be simplified. Furthermore, the generation of an operation sound involved in the mirror swinging can be reduced.

[Note 12]

In the image pickup apparatus of the present invention, the driving mechanism controls the mirror controller so as to allow the movable mirror to enter the optical path once during a series of operation periods including all or a part of the third and fourth operation periods.

According to the above configuration, the swinging repetitions of the movable mirror can be minimized, so that the mirror driving control can be simplified. Furthermore, the generation of an operation sound involved in the mirror swinging can be reduced.

[Note 13]

In the image pickup apparatus of the present invention, the driving mechanism controls the mirror controller so as to allow the movable mirror to enter the optical path once during a series of operation periods including all or a part of the second, third, fourth, and fifth operation periods.

According to the above configuration, the swinging repetitions of the movable mirror can be minimized, so that the mirror driving control can be simplified. Furthermore, the generation of an operation sound involved in the mirror swinging can be reduced.

[Note 14]

In the image pickup apparatus of the present invention, the cam for driving a mirror and the cam for driving a shutter are formed integrally.

According to the above configuration, a component count can be reduced. Furthermore, according to the configuration in which the cam for driving a mirror and the cam for driving a shutter are formed separately and thereafter, combined with each other, it is difficult to keep the relatively high position precision of both the cams; however, the relatively high position precision of both the cams can be kept by forming them integrally as in the present invention.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image pickup apparatus, comprising:
   a shutter having a first curtain and a second curtain;
   a shutter driver that drives the shutter so as to shift the first curtain from an open state to a closed state and to shift the second curtain from a closed state to an open state;
   a solenoid for a first curtain that holds the first curtain in the closed state with an electromagnetic force;
   a solenoid for a second curtain that holds the second curtain in the open state with an electromagnetic force;
   a holder capable of holding the second curtain and/or the first curtain in the open state mechanically;
   an image pickup that captures a subject image passing through the shutter to generate image data while the shutter is in the open state;
   a display that displays an image based on image data obtained by subjecting the image data generated by the image pickup to predetermined processing; and
   a controller that controls so that the display displays the image data generated based on the subject image incident upon the image pickup as a moving image while the holder holds the second curtain in the open state and holds the first curtain in the open state;
   a movable mirror that is placed so as to enter or retract with respect to an optical path in an image pickup optical system so as to guide the subject image to an optical viewfinder;
   a mirror driver that swings the movable mirror so that the movable mirror enters or retracts with respect to the optical path;
   a motor to be a driving source of the mirror driver and the shutter driver; and
   a driving mechanism that drives the mirror driver and the shutter driver in synchronization with rotation of the motor, the driving mechanism including:
      a cam for driving a mirror that drives the mirror driver; and
      a cam for driving a shutter that drives the shutter driver,
      wherein when the apparatus receives a photographing instruction, the cam for driving a mirror and the cam for driving a shutter rotate in one direction due to rotation in one direction caused by the motor, the cam for driving a mirror controls the mirror driver so as to swing the movable mirror, and the cam for driving a shutter controls the shutter driver so as to open or close the shutter;
   wherein the driving mechanism is capable of selectively being shifted to a finder view mode of driving the mirror driver so that the movable mirror is placed in the optical path and a live view mode of driving the mirror driver so that the movable mirror is retracted from the optical path, and
   the shutter holder holds the second curtain in the open state and holds the first curtain in the open state in the finder view mode,
   wherein the driving mechanism also includes, in a rotation range of the cam for driving a mirror and the cam for driving a shutter, a first stop position where the movable mirror is placed in the optical path and the first curtain and the second curtain are held in the open state, a second stop position where the movable mirror is retracted from the optical path and the first curtain and the second curtain are held in the open state, and a third stop position where the movable mirror is retracted from the optical path and the first curtain and the second curtain are held in the closed state, and
   wherein during a first operation period in which the first stop position is shifted to the second stop position, the movable mirror is retracted from the optical path, and the first curtain and the second curtain are held in the open state,
   during a second operation period in which the second stop position is shifted to the third stop position, the movable mirror is kept retracted from the optical path, and the first curtain and the second curtain are shifted to the closed state, and
   during a third operation period in which the third stop position is shifted to the first stop position, exposure in the image pickup is performed, and after completion of the exposure, the movable mirror is allowed to enter the optical path and the first curtain and the second curtain are shifted to the open state.

2. The image pickup apparatus according to claim 1, wherein the driving mechanism controls the mirror controller so as to allow the movable mirror to enter the optical path once during a series of operation periods including all or a part of the first, second, and third operation periods.

3. The image pickup apparatus according to claim 1, wherein the cam for driving a mirror and the cam for driving a shutter are formed integrally.

4. An image pickup apparatus, comprising:
a shutter having a first curtain and a second curtain;
a shutter driver that drives the shutter so as to shift the first curtain from an open state to a closed state and to shift the second curtain from a closed state to an open state;
a solenoid for a first curtain that holds the first curtain in the closed state with an electromagnetic force;
a solenoid for a second curtain that holds the second curtain in the open state with an electromagnetic force;
a holder capable of holding the second curtain and/or the first curtain in the open state mechanically;
an image pickup that captures a subject image passing through the shutter to generate image data while the shutter is in the open state;
a display that displays an image based on image data obtained by subjecting the image data generated by the image pickup to predetermined processing; and
a controller that controls the holder so as to hold the second curtain in the open state and controls the display so as to display the image data generated based on the subject image incident upon the image pickup as a moving image while the first curtain is in the open state;
a driving mechanism that drives a mirror driver and the shutter driver in synchronization with rotation of the motor, wherein the driving mechanism comprises a cam for driving a mirror that drives the mirror driver; and a cam for driving a shutter that drives the shutter driver,
wherein the driving mechanism includes, in a rotation range of the cam for driving a mirror and the cam for driving a shutter, a first stop position where the movable mirror is placed in an optical path and the first curtain and the second curtain are held in the open state, a second stop position where the movable mirror is retracted from the optical path and the first curtain and the second curtain are held in the open state, a third stop position where the movable mirror is retracted from the optical path and the first curtain and the second curtain are held in the closed state,
wherein during a fourth operation period in which the first stop position is shifted to the third stop position through the second stop position, the movable mirror is retracted outside of the optical path, the first curtain and the second curtain are held in the open state, the movable minor is kept retracted outside of the optical path, and the first curtain and the second curtain are shifted to the closed state,
during a third operation period in which the third stop position is returned to the first stop position, exposure in the image pickup is performed, after the completion of the exposure, the movable mirror is allowed to enter the optical path, and the first curtain and the second curtain can be shifted to the open state, and
during the fourth operation period, the first stop position is shifted to the third stop position without stopping at the second stop position.

5. The image pickup apparatus according to claim 4, wherein the driving mechanism controls the mirror controller so as to allow the movable minor to enter the optical path once during a series of operation periods including all or a part of the third and fourth operation periods.

6. An image pickup apparatus, comprising:
a shutter having a first curtain and a second curtain;
a shutter driver that drives the shutter so as to shift the first curtain from an open state to a closed state and to shift the second curtain from a closed state to an open state;
a solenoid for a first curtain that holds the first curtain in the closed state with an electromagnetic force;
a solenoid for a second curtain that holds the second curtain in the open state with an electromagnetic force;
a holder capable of holding the second curtain and/or the first curtain in the open state mechanically;
an image pickup that captures a subject image passing through the shutter to generate image data while the shutter is in the open state;
a display that displays an image based on image data obtained by subjecting the image data generated by the image pickup to predetermined processing; and
a controller that controls the holder so as to hold the second curtain in the open state and controls the display so as to display the image data generated based on the subject image incident upon the image pickup as a moving image while the first curtain is in the open state;
a driving mechanism that drives a mirror driver and the shutter driver in synchronization with rotation of the motor, wherein the driving mechanism comprises a cam for driving a mirror that drives the mirror driver; and a cam for driving a shutter that drives the shutter driver,
wherein the driving mechanism includes, in a rotation range of the cam for driving a mirror and the cam for driving a shutter, a first stop position where the movable mirror is placed in an optical path and the first curtain and the second curtain are held in the open state, a second stop position where the movable mirror is retracted from the optical path and the first curtain and the second curtain are held in the open state, a third stop position where the movable mirror is retracted from the optical path and the first curtain and the second curtain are held in the closed state,
wherein during a second operation period in which the second stop position is shifted to the third stop position, the movable mirror is kept retracted outside of the optical path, and the first curtain and the second curtain are shifted to the closed state,
during a fifth operation period in which the third stop position is returned to the second stop position through the first stop position, exposure in the image pickup is performed, after the completion of the exposure, the movable mirror is allowed to enter the optical path, the first curtain and the second curtain are shifted to the open state, the movable mirror is retracted outside of the optical path, and the first curtain and the second curtain are held in the open state, and
during the fifth period, the third stop position is shifted to the second stop position without stopping at the first stop position.

7. The image pickup apparatus according to claim 6, wherein the driving mechanism controls the mirror controller so as to allow the movable mirror to enter the optical path once during a series of operation periods including all or a part of the second and fifth operation periods.

8. An image pickup apparatus, comprising:
a shutter having a first curtain and a second curtain;
a shutter driver that drives the shutter so as to shift the first curtain from an open state to a closed state and to shift the second curtain from a closed state to an open state;
a solenoid for a first curtain that holds the first curtain in the closed state with an electromagnetic force;
a solenoid for a second curtain that holds the second curtain in the open state with an electromagnetic force;
a holder capable of holding the second curtain and/or the first curtain in the open state mechanically;

an image pickup that captures a subject image passing through the shutter to generate image data while the shutter is in the open state;

a display that displays an image based on image data obtained by subjecting the image data generated by the image pickup to predetermined processing; and a controller that controls the holder so as to hold the second curtain in the open state and controls the display so as to display the image data generated based on the subject image incident upon the image pickup as a moving image while the first curtain is in the open state;

a driving mechanism that drives a mirror driver and the shutter driver in synchronization with rotation of the motor, wherein the driving mechanism comprises a cam for driving a mirror that drives the mirror driver; and a cam for driving a shutter that drives the shutter driver, wherein the driving mechanism includes, in a rotation range of the cam for driving a mirror and the cam for driving a shutter, a first stop position where the movable mirror is placed in the optical path and the first curtain and the second curtain are held in the open state, a second stop position where the movable mirror is retracted from the optical path and the first curtain and the second curtain are held in the open state, and a third stop position where the movable mirror is retracted from the optical path and the first curtain and the second curtain are held in the closed state, when the apparatus receives a photographing instruction, during a fourth operation period in which the first stop position is shifted to the third stop position through the second stop position, the mirror controller is controlled to retract the movable mirror from the optical path, and the shutter driver is controlled to shift the first curtain and the second curtain to the closed state, during a third operation period in which the third stop position is shifted to the first stop position, exposure in the image pickup is performed, and after completion of the exposure, the mirror controller is controlled to allow the movable mirror to enter the optical path, and the shutter driver is controlled to shift the first curtain and the second curtain to the open state.

9. The image pickup apparatus according to claim 8, wherein the driving mechanism includes a second operation period in which the second stop position is shifted to the third stop position, and a fifth operation period in which the third stop position is shifted to the second stop position without stopping at the first stop position, wherein when the apparatus receives a photographing instruction during a finder view mode, the first stop position is shifted to the third stop position through the fourth operation period, and the third stop position is shifted to the first stop position through the third operation period, and when the apparatus receives a photographing instruction during a live view mode, the second stop position is shifted to the third stop position through the second operation period, and the third stop position is shifted to the second stop position through the fifth operation period.

10. The image pickup apparatus according to claim 9, wherein the driving mechanism controls the mirror controller so as to allow the movable mirror to enter the optical path once during a series of operation periods including all or a part of the second, third, fourth, and fifth operation periods.

11. The image pickup apparatus according to claim 8, wherein the driving mechanism controls the mirror controller so as to allow the movable mirror to enter the optical path once during a series of operation periods including all or a part of the third and fourth operation periods.

12. An image pickup apparatus, comprising:

a shutter having a first curtain and a second curtain;

a shutter driver that drives the shutter so as to shift the first curtain from an open state to a closed state and to shift the second curtain from a closed state to an open state;

a solenoid for a first curtain that holds the first curtain in the closed state with an electromagnetic force;

a solenoid for a second curtain that holds the second curtain in the open state with an electromagnetic force;

a holder capable of holding the second curtain and/or the first curtain in the open state mechanically;

an image pickup that captures a subject image passing through the shutter to generate image data while the shutter is in the open state;

a display that displays an image based on image data obtained by subjecting the image data generated by the image pickup to predetermined processing; and a controller that controls the holder so as to hold the second curtain in the open state and controls the display so as to display the image data generated based on the subject image incident upon the image pickup as a moving image while the first curtain is in the open state;

a driving mechanism that drives a mirror driver and the shutter driver in synchronization with rotation of the motor, wherein the driving mechanism comprises a cam for driving a mirror that drives the mirror driver; and a cam for driving a shutter that drives the shutter driver, wherein the driving mechanism includes, in a rotation range of the cam for driving a mirror and the cam for driving a shutter, a first stop position where the movable mirror is placed in the optical path and the first curtain and the second curtain are held in the open state, a second stop position where the movable minor is retracted from the optical path and the first curtain and the second curtain are held in the open state, and a third stop position where the movable mirror is retracted from the optical path and the first curtain and the second curtain are held in the closed state, wherein during a first operation period in which the first stop position is shifted to the second stop position, the movable mirror is retracted from the optical path, and the first curtain and the second curtain are held in the open state, during a second operation period in which the second stop position is shifted to the third stop position, the movable mirror is kept retracted from the optical path, and the first curtain and the second curtain are shifted to the closed state, and during a third operation period in which the third stop position is shifted to the first stop position, exposure in the image pickup is performed, and after completion of the exposure, the movable mirror is allowed to enter the optical path and the first curtain and the second curtain are shifted to the open state.

* * * * *

UNITED STATES PATENT AND TRADEMARK OFFICE
CERTIFICATE OF CORRECTION

PATENT NO.       : 7,920,201 B2                                              Page 1 of 1
APPLICATION NO.  : 11/961438
DATED            : April 5, 2011
INVENTOR(S)      : Wakikawa et al.

It is certified that error appears in the above-identified patent and that said Letters Patent is hereby corrected as shown below:

Column 31, lines 4-5 (claim 4): "state to ..." in line 5 should immediately follow continuously after "an open" in line 4. It should read -- an open state to a closed state ... --.

Column 31, line 44 (claim 4): "... minor ..." should read -- ... mirror ... --.

Column 31, lines 65-66 (claim 6): "state to ..." in line 66 should immediately follow continuously after "an open" in line 65. It should read -- an open state to a closed state ... --.

Column 32, lines 59-60 (claim 8): "state to ..." in line 60 should immediately follow continuously after "an open" in line 59. It should read -- an open state to a closed state ... --.

Column 34, lines 11-12 (claim 12): "state to ..." in line 12 should immediately follow continuously after "an open" in line 11. It should read -- an open state to a closed state ... --.

Signed and Sealed this
Eighth Day of May, 2012

David J. Kappos
*Director of the United States Patent and Trademark Office*